United States Patent
Suwa et al.

(10) Patent No.: US 10,096,966 B2
(45) Date of Patent: Oct. 9, 2018

(54) GAS LASER DEVICE AND CONDENSER

(71) Applicant: Gigaphoton Inc., Tochigi (JP)

(72) Inventors: Akira Suwa, Oyama (JP); Kouji Kakizaki, Oyama (JP); Hiroaki Tsushima, Oyama (JP); Tomoyuki Ohkubo, Oyama (JP); Hiroshi Umeda, Oyama (JP); Hisakazu Katsuumi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 46 days.

(21) Appl. No.: 15/290,518

(22) Filed: Oct. 11, 2016

(65) Prior Publication Data

US 2017/0033527 A1     Feb. 2, 2017

Related U.S. Application Data

(63) Continuation of application No. PCT/JP2015/068058, filed on Jun. 23, 2015.

(30) Foreign Application Priority Data

Jun. 26, 2014    (WO) ................. PCT/JP2014/067045

(51) Int. Cl.
     *H01S 3/097*       (2006.01)
     *H01G 4/14*       (2006.01)
     (Continued)

(52) U.S. Cl.
     CPC .......... *H01S 3/09702* (2013.01); *H01G 4/14* (2013.01); *H01G 4/258* (2013.01); *H01G 4/30* (2013.01); *H01S 3/041* (2013.01); *H01S 3/0305* (2013.01); *H01S 3/036* (2013.01); *H01S 3/0385* (2013.01); *H01S 3/097* (2013.01); *H01S 3/2251* (2013.01); *H01S 3/2256* (2013.01)

(58) Field of Classification Search
     CPC ............ H01S 3/097; H01S 3/04; H01G 4/258
     USPC .......................................... 372/36, 61, 62, 57
     See application file for complete search history.

(56) References Cited

U.S. PATENT DOCUMENTS 4,423,510 A * 12/1983 Pack ..................... H01S 3/0971
                                                372/56
4,555,746 A * 11/1985 Mochizuki .............. H01G 4/18
                                                361/309

(Continued)

FOREIGN PATENT DOCUMENTS

JP          64-31484      *   2/1989  ............... H01S 3/03
JP          S64-031484 A     2/1989

(Continued)

OTHER PUBLICATIONS

International Search Report issued in PCT/JP2015/068058; dated Sep. 29, 2015.

(Continued)

*Primary Examiner* — Tuan Nguyen
(74) *Attorney, Agent, or Firm* — Studebaker & Brackett PC

(57) ABSTRACT

A gas laser device may include: a laser chamber containing laser gas; a first discharge electrode disposed in the laser chamber; a second discharge electrode disposed to face the first discharge electrode in the laser chamber; and a condenser including a polyimide dielectric and configured to supply power to between the first discharge electrode and the second discharge electrode.

20 Claims, 16 Drawing Sheets

(51) Int. Cl.
*H01G 4/258* (2006.01)
*H01G 4/30* (2006.01)
*H01S 3/041* (2006.01)
*H01S 3/225* (2006.01)
*H01S 3/03* (2006.01)
*H01S 3/036* (2006.01)
*H01S 3/038* (2006.01)

(56) References Cited

U.S. PATENT DOCUMENTS

| | | | |
|---|---|---|---|
| 6,240,112 B1 | 5/2001 | Partlo et al. | |
| 2001/0050937 A1* | 12/2001 | Hori | H01S 3/038 372/55 |
| 2006/0133988 A1* | 6/2006 | Kurozumi | C01G 23/003 423/598 |
| 2006/0185140 A1* | 8/2006 | Andresakis | H01C 17/065 29/25.41 |
| 2008/0279247 A1* | 11/2008 | Scholz | H01S 3/03 372/65 |

FOREIGN PATENT DOCUMENTS

| | | | | |
|---|---|---|---|---|
| JP | 1-115114 | * | 5/1989 | |
| JP | H01-115114 A | | 5/1989 | |
| JP | 2-146716 | * | 6/1990 | ............... H01G 4/30 |
| JP | H02-146716 A | | 6/1990 | |
| JP | 8-213278 | * | 8/1996 | |
| JP | H08-213278 A | | 8/1996 | |
| JP | 10-261543 | * | 9/1998 | ............... H01G 4/18 |
| JP | H10-261543 A | | 9/1998 | |
| JP | 11-288835 | * | 10/1999 | ............... H01G 4/18 |
| JP | H11-288835 A | | 10/1999 | |
| JP | 3979863 A | | 9/2007 | |
| JP | 2009-099902 A | | 5/2009 | |
| JP | 2009-135189 | * | 6/2009 | ............ H01S 3/097 |
| JP | 2009-135189 A | | 6/2009 | |

OTHER PUBLICATIONS

Written Opinion issued in PCT/JP2015/068058; dated Sep. 29, 2015.

* cited by examiner

|  | POLYIMIDE CONDENSER | CERAMICS CONDENSER |
|---|---|---|
| ENERGY LOSS (DISSIPATION FACTOR; 3.5MHz) | 0.80% | 1.99% |
| TEMPERATURE DEPENDENCY OF CAPACITANCE (10°C~80°C) | <10% | 50% |
| HEATPROOF TEMPERATURE | 250°C | 85°C |

*FIG.4*

GAS LASER DEVICE AND CONDENSER

CROSS-REFERENCE(S) TO RELATED APPLICATION(S)

This application claims the benefit of International Patent Applications No. PCT/JP2015/068058 filed Jun. 23, 2015, which is incorporated herein by reference.

BACKGROUND

1. Technical Field

The present disclosure relates to a gas laser device and a condenser.

2. Related Art

The miniaturization and increased levels of integration of semiconductor integrated circuits have led to a demand for increases in the resolutions of semiconductor exposure apparatuses (hereinafter referred to as "exposure apparatus"). Accordingly, advances are being made in the reduction in the wavelengths of light emitted from exposure light sources. Gas laser devices are being used as exposure light sources instead of conventional mercury lamps. At present, a KrF excimer laser apparatus that emits ultraviolet light at a wavelength of 248 nm and an ArF excimer laser apparatus that emits ultraviolet light at a wavelength of 193 nm are being used as gas laser devices for exposure.

In the current generation exposure technology, immersion exposure has been in use, for reducing the apparent wavelength of an exposure light source by filling the space between the projection lens of an exposure apparatus and a wafer with a liquid, and changing the refractive index of the space. In the case where immersion exposure is carried out using an ArF excimer laser apparatus as the exposure light source, the wafer is irradiated with ultraviolet light at a wavelength of 134 nm in water. This technology is referred to as ArF immersion exposure. The ArF immersion exposure may be referred to as ArF immersion lithography.

The spectral line width of the spontaneous oscillation of a KrF or ArF excimer laser apparatus is as wide as 350 to 400 pm. Therefore, chromatic aberration occurs in a laser beam (ultraviolet light) which is reduced and projected by a projection lens of the exposure apparatus onto a wafer, and consequently the resolution is dropped. It is therefore necessary to narrow the spectral line width of the laser beam outputted from the gas laser device to the extent that the chromatic aberration is negligible. The spectral line width may be referred to as "spectral width." Accordingly, the spectral width has been narrowed by providing a line narrowing module (LNM) having a line narrowing element in a laser resonator of the gas laser device. Here, examples of the line narrowing element may include an etalon and a grating. A laser apparatus having a narrowed spectral width in this manner is referred to as a line narrowing laser apparatus.

CITATION LIST

Patent Literature

PTL1: Japanese Patent No. 3979863
PTL2: Japanese Patent Application Laid-Open No. 2009-99902
PTL3: U.S. Pat. No. 6,240,112
PTL4: Japanese Patent Application Laid-Open No. 2009-135189
PTL5: Japanese Patent Application Laid-Open No. SH064-31484
PTL6: Japanese Patent Application Laid-Open No. HEI10-261543
PTL7: Japanese Patent Application Laid-Open No. HEI11-288835
PTL8: Japanese Patent Application Laid-Open No. HEI8-213278
PTL9: Japanese Patent Application Laid-Open No. HEI2-146716
PTL10: Japanese Patent Application Laid-Open No. HEI1-115114

SUMMARY

According to an aspect of the present disclosure, a gas laser device may include: a laser chamber containing laser gas; a first discharge electrode disposed in the laser chamber; a second discharge electrode disposed to face the first discharge electrode in the laser chamber; and a condenser including a polyimide dielectric and configured to supply power to between the first discharge electrode and the second discharge electrode.

According to an aspect of the present disclosure, a condenser may include a polyimide dielectric and be configured to supply power to between discharge electrodes of a gas laser device.

BRIEF DESCRIPTION OF THE DRAWINGS

Hereinafter, selected exemplary embodiments of the present disclosure will be described with reference to the accompanying drawings.

FIG. 4 is a drawing showing a comparison in characteristics between a condenser having a dielectric made of polyimide and a condenser having a dielectric made of ceramics;

DESCRIPTION OF EXEMPLARY EMBODIMENTS

Figure 1:
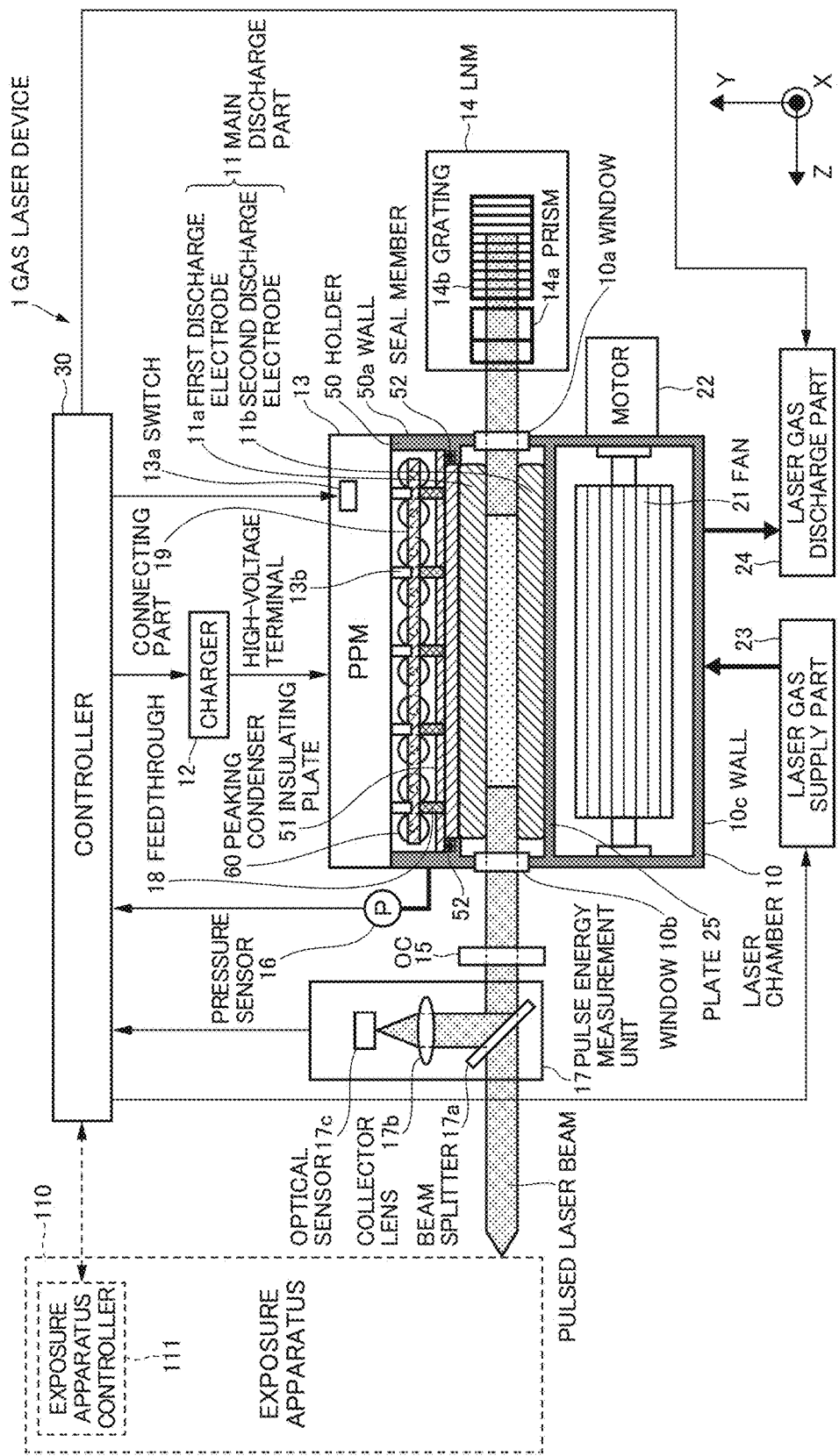
FIG. 1 schematically shows the configuration of a gas laser device.

<Contents>
1. Overview
2. Description of terms
3. Gas laser device
3.1 Configuration
3.2 Operation
3.3 Problem
4. Polyimide condenser
4.1 Characteristics
4.2 Basic structure
4.3 Structure of a multi-layered condenser
5. Polyimide condenser applied to a charging condenser
6. Gas laser device including the polyimide condenser
7. Modifications of the polyimide condenser
8. Others
8.1 Charge and discharge circuit used in the gas laser device
8.2 Modification Hereinafter, selected embodiments of the present disclosure will be described in detail with reference to the accompanying drawings. The embodiments to be described below are merely examples and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. Overview

The present disclosure may disclose at least the following embodiments.

The gas laser device 1 may include a laser chamber 10 containing laser gas; a first discharge electrode 11a disposed in the laser chamber 10; a second discharge electrode 11b disposed in the laser chamber 10 to face the first discharge electrode 11a; and a polyimide condenser 70 having a polyimide dielectric and configured to supply power to between the first discharge electrode 11a and the second discharge electrode 11b. With this configuration, the gas laser device 1 can stabilize the performance of the condenser, and therefore stabilize the performance of a laser beam.

2. Description of Terms

"Optical path axis" means an axis passing through the center of the beam cross-section of a laser beam along the traveling direction of the laser beam. "Optical path" means a path through which a laser beam passes. The optical path may include the optical path axis.

3. Gas Laser Device 3.1 Configuration

Figure 2:
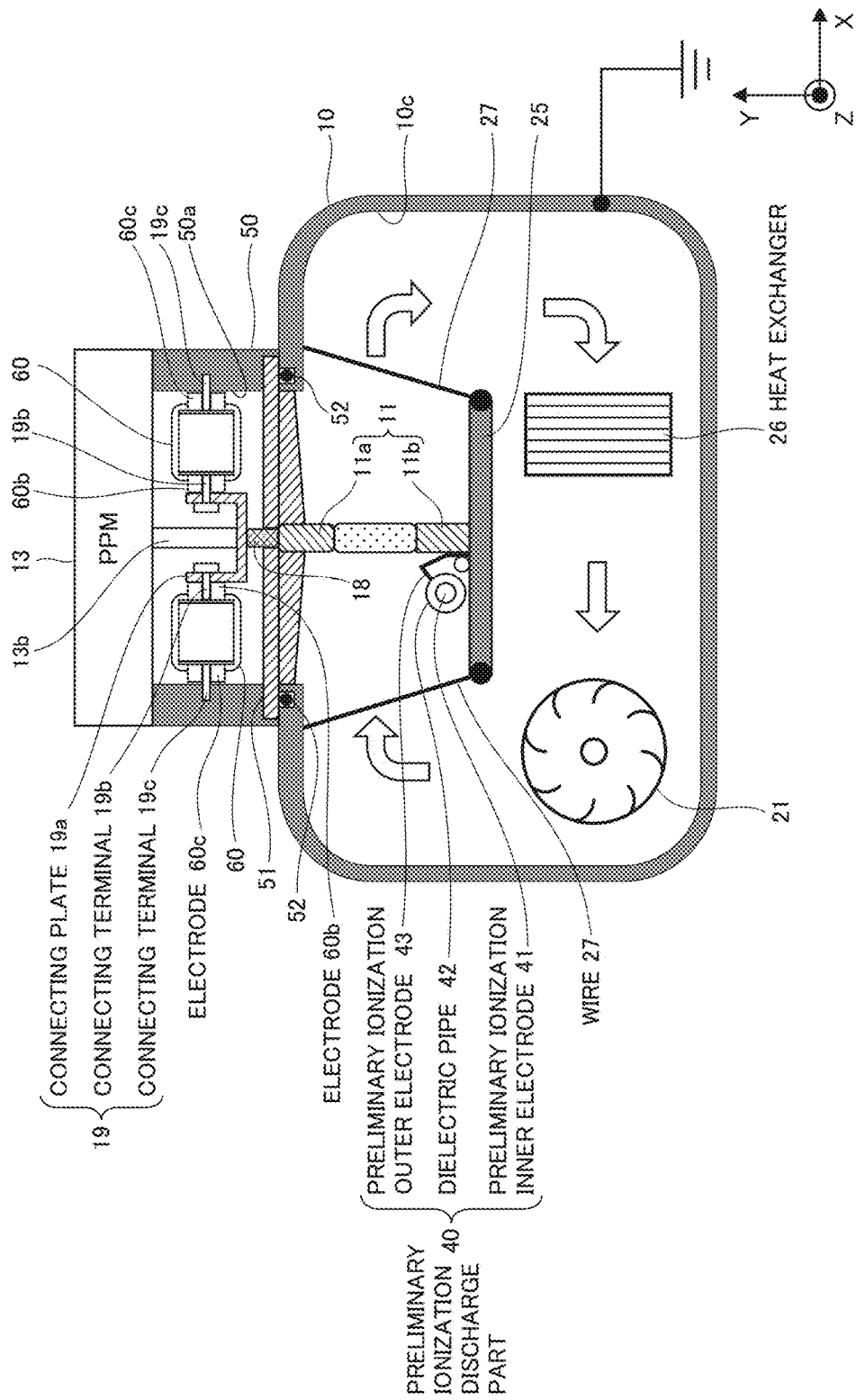
FIG. 2 is a cross-sectional view showing a laser chamber shown in FIG. 1 from a Z-axis direction.
Figure 3:
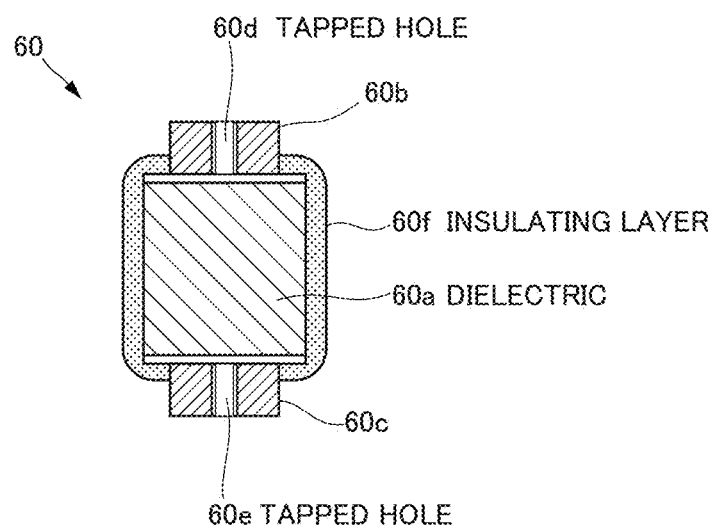
FIG. 3 is a drawing explaining the configuration of a peaking condenser shown in FIGS. 1 and 2.

With reference to FIGS. 1 to 3, the configuration of the gas laser device 1 will be described. FIG. 1 schematically shows the configuration of the gas laser device 1. FIG. 2 is a cross-sectional view showing the laser chamber 10 shown in FIG. 1 as viewed from the Z-axis direction. In FIG. 1, the traveling direction of a laser beam outputted from the gas laser device 1 is defined as the Z-axis direction. That is, the direction in which a pulsed laser beam is outputted from the laser chamber 10 to the exposure apparatus 110 is defined as the Z-axis direction. An X-axis and a Y-axis are orthogonal to the Z-axis, and are orthogonal to one another. The same definition of these coordinate axes will be applied to the other drawings described later.

The gas laser device 1 may be a discharge excited gas laser device. The gas laser device 1 may be an excimer laser device. Laser gas as a laser medium may include rare gas such as argon or krypton, halogen gas such as fluorine, and buffer gas such as neon or helium, or a mixture thereof.

The gas laser device 1 may include the laser chamber 10, a holder 50, an insulating plate 51, a seal member 52, a connecting part 19, a peaking condenser 60, a charger 12, a pulse power module (PPM) 13, a laser resonator, a pulse energy measurement unit 17, a motor 22, a pressure sensor 16, a laser gas supply part 23, a laser gas discharge part 24 and a controller 30.

The laser chamber 10 may enclose the laser gas. A wall 10c forming the inner space of the laser chamber 10 may be made of a metallic material such as aluminum metal. For example, nickel plating may be applied to the surface of the metallic material used for forming the wall 10c of the laser chamber 10. The wall 10c of the laser chamber 10 may be connected to ground. The wall 10c of the laser chamber 10 may have an opening. The periphery of the opening of the wall 10c of the laser chamber 10 may be bonded to the insulating plate 51 via the seal member 52. The seal member 52 may be, for example, an O ring. The periphery of the opening of the wall 10c of the laser chamber 10 may be bonded to the end of a wall 50a of the holder 50. The wall 10c of the laser chamber 10 may be electrically connected to the wall 50a of the holder 50.

The laser chamber 10 may include a main discharge part 11, a preliminary ionization discharge part 40, a window 10a, a window 10b, a plate 25, a wire 27, a feedthrough 18, a fan 21 and a heat exchanger 26.

The main discharge part 11 may excite the laser gas by a main discharge. The main discharge part 11 may include the first discharge electrode 11a and the second discharge electrode 11b. The first discharge electrode 11a and the second discharge electrode 11b may be a pair of electrodes to excite the laser gas by the main discharge. The main discharge may be a glow discharge. The first discharge electrode 11a and the second discharge electrode 11b may be formed by plate-like conductive members, respectively. The first discharge electrode 11a and the second discharge electrode 11b may be arranged to face one another with a predetermined distance therebetween, in approximately parallel with one another in their longitudinal direction. The first discharge electrode 11a and the second discharge electrode 11b may be arranged such that their discharge surfaces face one another. With the present embodiment, the direction in which the discharge surfaces of the first discharge electrode 11a and the second discharge electrode 11b face one another is defined as the Y-axis direction.

Here, with the present embodiment, space between the discharge surface of the first discharge electrode 11a and the discharge surface of the second discharge electrode 11b may be referred to as "discharge space." The laser gas enclosed in the laser chamber 10 may exist in the discharge space. The main discharge may be generated in the discharge space.

The first discharge electrode 11a may be a cathode electrode. The surface opposite to the discharge surface of the first discharge electrode 11a may be connected to the peaking condenser 60 via the feedthrough 18 and the connecting part 19. A pulse voltage may be applied from the PPM 13 to between the first discharge electrode 11a and the second discharge electrode 11b via the peaking condenser 60. The second discharge electrode 11b may be an anode electrode. The surface opposite to the discharge surface of the second discharge electrode 11b may be fixed to the plate 25.

The plate 25 may be formed with a conductive member. The plate 25 may be connected to the grounded wall 10c of the chamber 10 via the wire 27. The plate 25 may be maintained at a ground potential. The end of the plate 25 may be fixed to the wall 10c of the laser chamber 10.

The preliminary ionization discharge part 40 may be electrodes to preliminarily ionize the laser gas by a corona discharge prior to the main discharge by the main discharge part 11. The preliminary ionization discharge part 40 may be fixed to the plate 25. The preliminary ionization discharge part 40 may be disposed upstream of the flow of the laser gas with respect to the second discharge electrode 11b. The preliminary ionization discharge part 40 may include a preliminary ionization inner electrode 41, a dielectric pipe 42, and a preliminary ionization outer electrode 43.

The dielectric pipe 42 may be formed in a cylindrical shape. The dielectric pipe 42 may be disposed such that its longitudinal direction is approximately parallel to the longitudinal direction of the main discharge part 11. The preliminary ionization inner electrode 41 may be formed in a rod shape. The preliminary ionization inner electrode 41 may be inserted into the dielectric pipe 42 and fixed to the inner periphery of the dielectric pipe 42. An end of the preliminary ionization inner electrode 41 may be connected to a condenser for preliminary ionization (not shown) in the holder 50 via a feedthrough (not shown). This condenser for preliminary ionization may be connected to the peaking condenser 60. The preliminary ionization outer electrode 43 may be formed in a plate-like shape having a bending portion. The preliminary ionization outer electrode 43 may be disposed such that the top end of the bent preliminary ionization outer electrode 43 substantially contacts the outer periphery of the dielectric pipe 42 along the longitudinal direction of the preliminary ionization outer electrode 43. The preliminary ionization outer electrode 43 may be fixed to the second discharge electrode 11b or the plate 25.

The feedthrough 18 may be a conductive member configured to electrically connect the first discharge electrode 11a located inside of the laser chamber 10 to the peaking condenser 60 located outside of the laser chamber 10 while the inside of the laser chamber 10 is isolated from the outside. One end of the feedthrough 18 may be electrically connected to the surface opposite to the discharge surface of the first discharge electrode 11a. The other end of the feedthrough 18 may be electrically connected to a connecting plate 19a (described later) of the connecting part 19.

The fan 21 may circulate the laser gas in the laser chamber 10. The fan 21 may be a crossflow fan. The fan 21 may be disposed such that its longitudinal direction is approximately parallel to the longitudinal direction of the first discharge electrode 11a and the second discharge electrode 11b. The fan 21 may be disposed opposite to the discharge space with respect to the plate 25. The fan 21 may be rotated by driving the motor 22. The rotating fan 21 may generate the flow of the laser gas.

When the fan 21 is rotated, the laser gas in the laser chamber 10 may be approximately uniformly blown out in the direction which is approximately perpendicular to the longitudinal direction of the fan 21. The laser gas blown out of the fan 21 may flow into the discharge space. The direction of the laser gas flowing into the discharge space may be approximately perpendicular to the longitudinal direction of the first discharge electrode 11a and the second discharge electrode 11b. The laser gas having flowed into the discharge space may flow out of this discharge space. The direction of the laser gas flowing out of the discharge space may be approximately perpendicular to the longitudinal direction of the first discharge electrode 11a and the second discharge electrode 11b. The laser gas having flowed out of the discharge space may be sucked into the fan 21 via the heat exchanger 26.

The heat exchanger 26 may perform a heat exchange between a refrigerant supplied into the heat exchanger 26 and the laser gas. The amount of the refrigerant supplied into the heat exchanger 26 may be changed according to the control of the controller 30. When the amount of the supplied refrigerant is changed, the amount of the heat transferring from the laser gas to the refrigerant may be changed. By this means, it is possible to adjust the temperature of the laser gas in the laser chamber 10.

The insulating plate 51 may close the opening of the laser chamber 10. The insulating plate 51 may be formed by using an insulating material having low reactivity with laser gas. If the laser gas is fluorine, the insulating plate 51 may be formed by using, for example, alumina ceramics. The insulating plate 51 may be disposed between the laser chamber 10 and the holder 50. The insulating plate 51 may be fixed to the wall 50a of the holder 50. The insulating plate 51 may be bonded to the periphery of the opening of the wall 10c of the laser chamber 10 via the seal member 52. The insulating plate 51 may isolate the interior space of the laser chamber 10 from the interior space of the holder 50. The insulating plate 51 may be provided to enclose the side surfaces of the first discharge electrode 11a and the feedthrough 18. The insulating plate 51 may hold the first discharge electrode 11a and the feedthrough 18 on the wall 10c. The insulating plate 51 may electrically insulate the first discharge electrode 11a from the wall 10c of the laser chamber 10.

The insulating plate 51 may be located upstream and downstream of the flow of the laser gas with respect to the first discharge electrode 11a. Part of the insulating plate 51 located upstream of the flow of the laser gas with respect to the first discharge electrode 11a may have an inclined surface whose thickness is increased from upstream to downstream. Another part of the insulating plate 51 located downstream of the flow of the laser gas with respect to the first discharge electrode 11a may have an inclined surface whose thickness is decreased from upstream to downstream. This allows the laser gas to be guided by the inclined surface of the insulating plate 51, and to efficiently flow between the first discharge electrode 11a and the second discharge electrode 11b. Here, although not shown, an insulating member having an inclined surface similar to that of the insulating plate 51 may be provided to surround the side surface of the second discharge electrode 11b. This allows the laser gas to more efficiently flow between the first discharge electrode 11a and the second discharge electrode 11b.

The holder 50 may be a container to hold the peaking condenser 60. The wall 50a forming the interior space of the holder 50 may be formed by using a metallic material such as aluminum metal. For example, nickel plating may be applied to the surface of the metallic material forming the wall 50a of the holder 50. The peaking condenser 60, the connecting part 19, and a high-voltage terminal 13b of the PPM 13 may be disposed in the holder 50.

The peaking condenser 60 may supply power to the main discharge part 11 and the preliminary ionization discharge part 40. The peaking condenser 60 may receive electrical energy to be applied to the main discharge part 11 and the preliminary ionization discharge part 40 from the PPM 13, and accumulate the electrical energy therein. The peaking condenser 60 may discharge the accumulated electrical energy to the main discharge part 11 and the preliminary ionization discharge part 40. A plurality of peaking condensers 60 may be disposed in the holder 50. The plurality of peaking condensers 60 may be disposed at positions in the holder 50 such that more than one peaking condensers 60 are disposed upstream of the flow of the laser gas with respect to the first discharge electrode 11a and more than one peaking condensers 70 are disposed downstream of the flow of the laser gas with respect to the first discharge electrode 11a. The plurality of peaking condensers 60 may be disposed along the longitudinal direction of the first discharge electrode 11a. An electrode 60b, which is one of the electrodes of each of the peaking condensers 60, may be connected to the high-voltage terminal 13b of the PPM 13 via the connecting part 19. This electrode 60b may be connected to the first discharge electrode 11a via the connecting part 19 and the feedthrough 18. Meanwhile, an electrode 60c, which is the other electrode of each of the peaking condensers 60, may be connected to the wall 50a of the holder 50 via the connecting part 19. Here, the detailed configuration of the peaking condenser 60 will be described later with reference to FIG. 3.

The connecting part 19 may be a member to connect the peaking condensers 60 to other components. The connecting part 19 may include a connecting plate 19a, connecting terminals 19b and connecting terminals 19c.

The connecting plate 19a may be constituted by a conductive plate having a U-shaped cross section. The connecting plate 19a may be disposed along the longitudinal direction of the first discharge electrode 11a. The connecting plate 19a may be disposed such that its bottom part faces the surface opposite to the discharge surface of the first discharge electrode 11a. The outer surface of the bottom part of the connecting plate 19a may be electrically connected to the feedthrough 18. Meanwhile, the inner surface of the bottom part of the connecting plate 19a may be electrically connected to the high-voltage terminal 13b of the PPM 13. Two side parts of the connecting plate 19a may be located upstream and downstream of the flow of the laser gas with respect to the first discharge electrode 11a, respectively. The side part of the connecting plate 19a located upstream of the flow of the laser gas with respect to the first discharge electrode 11a may be electrically connected to the electrode 60b of each of the plurality of peaking condensers 60 located upstream of the flow of the laser gas with respect to the first discharge electrode 11a via each of the plurality of connecting terminals 19b. Meanwhile, the side part of the connecting plate 19a located downstream of the flow of the laser gas with respect to the first discharge electrode 11a may be electrically connected to the electrode 60b of each of the plurality of peaking condensers 60 located downstream of the flow of the laser gas with respect to the first discharge electrode 11a via each of the plurality of connecting terminals 19b.

The connecting terminals 19b may electrically connect the electrodes 60b of the plurality of peaking condensers 60 to the side part of the connecting plate 19a. By this means, the electrodes 60b of the peaking condensers 60 may be electrically connected to the first discharge electrode 11a by the connecting part 19 including the connecting plate 19a and the connecting terminals 19b. In addition, the electrodes 60b of the peaking condensers 60 may be electrically connected to the high-voltage terminal 13b of the PPM 13 by the connecting part 19 including the connecting plate 19a and the connecting terminals 19b. In addition, the connecting terminals 19c may electrically connect the electrodes 60c of the plurality of peaking condensers 60 to the wall 50a of the holder 50. By this means, it is possible to electrically connect the electrodes 60c of the peaking condensers 60 to the wall 50a of the holder 50 connected to the wall 10c of the grounded laser chamber 10 by the connecting part 19 including the connecting terminals 19c.

The charger 12 may be a DC power supply device configured to charge a charging condenser $C_0$ of the PPM 13 at a predetermined voltage. The charger 12 may charge the charging condenser $C_0$ of the PPM 13 at a predetermined voltage, according to the control of the controller 30.

The PPM 13 may apply a pulse voltage to the main discharge part 11 and the preliminary ionization discharge part 40. The high-voltage terminal 13b of the PPM 13 may be connected to the peaking condensers 60 via the connecting part 19. The PPM 13 may include a switch 13a controlled by the controller 30. When the switch 13a is turned from off to on, the PPM 13 may generate a pulse voltage from the electric energy stored in the charging condenser $C_0$. The PPM 13 may apply the generated pulse voltage to the main discharge part 11 and the preliminary ionization discharge part 40. At this time, the PPM 13 may apply the generated pulse voltage to the peaking condensers 60 to charge the peaking condensers 60. Then, the PPM 13 may apply the pulse voltage to the main discharge part 11 and the preliminary ionization discharge part 40, by using the discharge from the peaking condensers 60 charged.

The laser resonator may be constituted by a line narrowing module (LNM) 14 and an output coupler (OC) 15. The LNM 14 may include a prism 14a and a grating 14b.

The prism 14a may expand the beam width of the light emitted from the laser chamber 10 via the window 10a. The prism 14a may allow the expanded light to transmit therethrough toward the grating 14b.

The grating 14b may be a wavelength dispersion element having a number of grooves formed in its surface at a predetermined interval. The grating 14b may be provided in a Littrow configuration so that the incident angle is the same as the diffraction angle. The grating 14b may pick out the light at around a specific wavelength, depending on the angle of the diffraction. The light at around the specific wavelength may return from the grating 14b back to the laser chamber 10 via the prism 14a and the window 10a. By this means, it is possible to narrow the spectral width of the light that returns from the grating 14b to the laser chamber 10.

The OC 15 may allow part of the light emitted from the laser chamber 10 via the window 10b to transmit therethrough while reflecting part of the remaining light back to the laser chamber 10. A partial reflection coating may be applied to the surface of the OC 15.

In this way, the OC 15 and the LNM 14 may constitute the laser resonator.

The light emitted from the laser chamber 10 may reciprocate between the LNM 14 and the OC 15. At this time, the light emitted from the laser chamber 10 may be amplified every time the light passes through the discharge space of the main discharge part 11 in the laser chamber 10. Part of the amplified light may transmit through the OC 15. The light having transmitted through the OC 15 may be outputted to the exposure apparatus 110 via the pulse energy measurement unit 17, as a pulsed laser beam.

The pulse energy measurement unit 17 may measure the pulse energy of the pulsed laser beam having transmitted through the OC 15, and output the result of the measurement to the controller 30. The pulse energy measurement unit 17 may include a beam splitter 17a, a collector lens 17b, and an optical sensor 17c.

The beam splitter 17a may be provided on the optical path of the pulsed laser beam. The beam splitter 17a may allow the pulsed laser beam having transmitted through the OC 15 to transmit through the beam splitter 17a toward the exposure apparatus 110 with a high transmittance. The beam splitter 17a may reflect part of the pulsed laser beam having transmitted through the OC 15 toward the collector lens 17b. The collector lens 17b may focus the pulsed laser beam reflected from the beam splitter 17a on a light receiving surface of the optical sensor 17c. The optical sensor 17c may detect the pulsed laser beam focused on the light receiving surface. The optical sensor 17c may measure the pulse energy of the detected pulsed laser beam. The optical sensor 17c may output a signal indicative of the measured pulse energy to the controller 30.

The pressure sensor 16 may detect the gas pressure in the laser chamber 10. The pressure sensor 16 may output a detection signal indicative of the detected gas pressure to the controller 30.

The motor 22 may rotate the fan 21. The motor 22 may be a DC motor or an AC motor. The motor 22 may change the number of the rotations of the fan 21 according to the control of the controller 30.

The laser gas supply part 23 may supply the laser gas into the laser chamber 10. The laser gas supply part 23 may include a gas bomb, a valve, and a flow control valve (not shown). The gas bomb may be filled with the laser gas. The valve may block off the flow of the laser gas from the gas bomb to the laser chamber 10. The flow control valve may change the amount of the laser gas being supplied from the gas bomb into the laser chamber 10.

The laser gas supply part 23 may open and close the valve according to the control of the controller 30. The laser gas supply part 23 may change the degree of the opening of the flow control valve according to the control of the controller 30. When the degree of the opening of the flow control valve is changed, the amount of the laser gas being supplied into the laser chamber 10 may be changed. By this means, it is possible to adjust the gas pressure in the laser chamber 10.

The laser gas discharge part 24 may discharge the laser gas in the laser chamber 10 to the outside of the laser chamber 10. The laser gas discharge part 24 may include a valve and an exhaust pump (not shown). The valve may block off the flow of the laser gas from the inside to the outside of the laser chamber 10. The exhaust pump may suck in the laser gas in the laser chamber 10.

The laser gas discharge part 24 may open and close the valve according to the control of the controller 30. The laser gas discharge part 24 may activate the exhaust pump according to the control of the controller 30. When the exhaust pump is activated, the laser gas in the laser chamber 10 may be sucked into the exhaust pump. By this means, it is possible to discharge the laser gas in the laser chamber 10 to the outside of the laser chamber 10, and therefore to reduce the gas pressure in the laser chamber 10.

The controller 30 may send/receive various signals to/from an exposure apparatus controller 111 of the exposure apparatus 110. For example, a signal indicative of a target pulse energy or a target oscillation timing of the pulsed laser beam outputted to the exposure apparatus 110 may be sent from the exposure apparatus controller 111 to the controller 30. The controller 30 may totally control the operation of each component of the gas laser device 1, based on the various signals sent from the exposure apparatus controller 111.

A signal indicative of the pulse energy, which is outputted from the pulse energy measurement unit 17, may be inputted to the controller 30. Based on this signal indicative of the pulse energy and the signal indicative of the target pulse energy sent from the exposure apparatus controller 111, the controller 30 may determine the charging voltage of the charger 12. The controller 30 may output a control signal corresponding to the determined charging voltage to the charger 12. This control signal may be a signal for controlling the operation of the charger 12 to set the determined charging voltage in the charger 12. The controller 30 may determine the timing to apply the pulse voltage to the main discharge part 11, based on the signal indicative of the pulse energy sent from the pulse energy measurement unit 17 and the signal indicative of the target oscillation timing sent from the exposure apparatus controller 111. The controller 30 may output an oscillation trigger signal corresponding to the determined timing to the PPM 13. This oscillation trigger signal may be a control signal for controlling the operation of the PPM 13 to turn the switch 13a on or off according to the determined timing.

A detection signal indicative of the gas pressure outputted from the pressure sensor 16 may be inputted to the controller 30. The controller 30 may determine the gas pressure of the laser gas in the laser chamber 10, based on the detection signal indicative of the gas pressure and the charging voltage of the charger 12. The controller 30 may output the control signal corresponding to the determined gas pressure to the laser gas supply part 23 or the laser gas discharge part 24. This control signal may be a signal for controlling the operation of the laser gas supply part 23 or the laser gas discharge part 24 to supply/discharge the laser gas to/from the laser chamber 10, based on the determined gas pressure.

With the above-described configuration, a current path formed by the charger 12, the PPM 13, the feedthrough 18, the connecting part 19, the peaking condensers 60, the main discharge part 11, the preliminary ionization discharge part 40, the plate 25, the wire 27, and the wall 10c may constitute a discharge circuit of the gas laser device 1. With the present embodiment, the area of the region enclosed by the loop of the current path constituting the discharge circuit may be referred to as "loop area" of the discharge circuit. If the loop area of the discharge circuit of the gas laser device 1 is reduced, the inductance of the discharge circuit may be reduced. If the inductance of the discharge circuit is reduced, the discharge efficiency of the discharge circuit may be increased. Here, "discharge efficiency" may be a ratio between the energy inputted from an outside power supply device to the gas laser device 1 and the energy released from the gas laser device 1 by the discharge. The detailed circuit configuration of the discharge circuit of the gas laser device 1 will be described later with reference to FIG. 13.

Now, with reference to FIG. 3, the detailed configuration of the peaking condenser 60 will be described. FIG. 3 is a drawing explaining the configuration of the peaking condensers 60 shown in FIGS. 1 and 2.

The peaking condenser 60 may be formed into an approximately cylindrical shape. As shown in FIG. 3, the peaking condenser 60 may include a dielectric 60*a*, the electrode 60*b*, the electrode 60*c*, a tapped hole 60*d*, a tapped hole 60*e*, and an insulating layer 60*f*. The dielectric 60*a* may be formed by using ceramics of strontium titanate and so forth. The electrodes 60*b* and 60*c* may be formed by using brass. The tapped hole 60*d* may be a hole to connect the connecting terminal 19*b* of the connecting part 19 to the electrode 60*b*. Meanwhile, the tapped hole 60*e* may be a hole to connect the connecting terminal 19*c* of the connecting part 19 to the electrode 60*c*. The insulating layer 60*f* may be formed by using epoxy resin.

3.2 Operation

The controller 30 may control the laser gas supply part 23 to supply the laser gas into the laser chamber 10. The laser gas may be enclosed in the laser chamber 10. The controller 30 may drive the motor 22 to rotate the fan 21. By this means, it is possible to circulate the laser gas in the laser chamber 10.

The controller 30 may receive a signal indicative of a target pulse energy Et and a target oscillation timing sent from the exposure apparatus controller 111. The controller 30 may set a charging voltage Vhv corresponding to the target pulse energy Et in the charger 12. The controller 30 may store the value of the charging voltage Vhv set in the charger 12. The controller 30 may operate the switch 13*a* of the PPM 13 in synchronization with the target oscillation timing.

When the switch 13*a* of the PPM 13 is turned from off to on, a voltage may be applied to between the preliminary ionization inner electrode 41 and the preliminary ionization outer electrode 43 of the preliminary ionization discharge part 40. Then, a voltage may be applied to between the first discharge electrode 11*a* and the second discharge electrode 11*b* of the main discharge part 11. By this means, a corona discharge may be generated in the preliminary ionization discharge part 40, so that ultraviolet (UV) light may be generated. When the laser gas in the discharge space of the main discharge part 11 is irradiated with the UV light, the laser gas may be preliminarily ionized. After that, the main discharge may be generated in the discharge space of the main discharge part 11. Here, the discharge direction of the main discharge, that is, the direction in which electrons move, is a direction from the first discharge electrode 11*a* as a cathode electrode to the second discharge electrode 11*b* as an anode electrode. When the main discharge is generated, the laser gas in the discharge space may be excited and emit light.

The light emitted from the laser gas may be reflected from the LNM 14 and the OC 15 constituting the laser resonator, and reciprocate in the laser resonator. The spectral width of the light reciprocating in the laser resonator may be narrowed by the LNM 14. The light reciprocating in the laser resonator may be amplified every time the light passes through the discharge space of the main discharge part 11. After that, part of the amplified light may transmit through the OC 15. The light having transmitted through the OC 15 may be outputted to the exposure apparatus 110 as a pulsed laser beam.

Part of the pulsed laser beam having transmitted through the OC 15 may enter the pulse energy measurement unit 17. The pulse energy measurement unit 17 may measure a pulse energy E of the pulsed laser beam having entered the pulse energy measurement unit 17, and output the result of the measurement to the controller 30.

The controller 30 may store the pulse energy E measured by the pulse energy measurement unit 17. The controller 30 may calculate a difference $\Delta E$ between the pulse energy E as a measured value and the target pulse energy Et. The controller 30 may calculate an increase/decrease $\Delta Vhv$ in the charging voltage Vhv which corresponds to the difference $\Delta E$. The controller 30 may add the calculated $\Delta Vhv$ to the charging voltage Vhv stored as described above to calculate the charging voltage Vhv to be newly set. In this way, the controller 30 may perform a feedback control of the charging voltage Vhv.

When the charging voltage Vhv set newly is greater than an allowable maximum value, the controller 30 may control the laser gas supply part 23 to supply the laser gas into the laser chamber 10 until the gas pressure in the laser chamber 10 becomes a predetermined gas pressure. On the other hand, when the charging voltage Vhv set newly is smaller than an allowable minimum value, the controller 30 may control the laser gas discharge part 24 to discharge the laser gas from the laser chamber 10 until the gas pressure in the laser chamber 10 becomes a predetermined gas pressure.

3.3 Problem

The gas laser device 1 may need to apply a high pulse voltage to the main discharge part 11 at a high repetition frequency, in order to output a high-power pulsed laser beam at a high repetition frequency. Accordingly, it is required to charge and discharge the peaking condenser 60 at a high pulse voltage and a high repetition frequency, so that the peaking condenser 60 is easy to generate heat and therefore increase its temperature. As a material of the dielectric 60*a* of the peaking condenser 60, ceramics of strontium titanate and so forth may be used because of its high performance on the dielectric withstanding voltage.

However, the dielectric 60*a* made of ceramics may be characterized in that its dielectric constant largely depends on temperature. If the dielectric constant of the dielectric 60*a* is changed, the capacitance of the peaking condenser 60 may also be changed. Therefore, if the peaking condenser 60 is charged and discharged at a high pulse voltage and a high repetition frequency, the capacitance of the peaking condenser 60 may be changed. By this means, the pulse voltage applied from the peaking condenser 60 to the main discharge part 11 is not stable, and therefore the performance of the pulsed laser beam outputted from the gas laser device 1 may be unstable. To be more specific, the pulse energy, the waveform including the pulse width, and the waveform including the spectral width of the pulsed laser beam outputted from the gas laser device 1 may be unstable.

Moreover, the peaking condenser 60 including the dielectric 60*a* made of ceramics may be characterized in that its dissipation factor (tan δ) is increased in a high-frequency region. Then, if the dissipation factor of the peaking condenser 60 is high, the energy loss may be increased. Consequently, the peaking condenser 60 may generate heat and therefore increase its temperature. This may cause the peaking condenser 60 to decrease in capacitance and deteriorate. Given this situation, for the gas laser device 1 configured to output a pulsed laser beam at a high repetition frequency, there is a demand for a technology that stabilizes the performance of the peaking condenser 60.

4. Polyimide Condenser

As a condenser to supply power to the main discharge part 11, the gas laser device 1 may employ a polyimide condenser 70 having a dielectric made of polyimide, instead of the peaking condenser 60 having the dielectric made of ceramics.

4.1 Characteristics

With reference to FIG. 4, the characteristics of the condenser having a dielectric made of polyimide will be described. FIG. 4 is a drawing explaining a comparison in characteristics between the condenser having a dielectric made of polyimide (referred to as "polyimide condenser") and the condenser having a dielectric made of ceramics (referred to as "ceramics condenser).

The first row of the table shown in FIG. 4 represents a comparison between values expressed in percentage, which are the dissipation factors as the energy losses of the polyimide condenser and the ceramics condenser in a high frequency region of 3.5 MHz. As shown in the first row of the table of FIG. 4, the polyimide condenser only has a loss of 0.8% while the ceramics condenser has a loss of 1.99%. That is, the polyimide condenser can more effectively reduce the energy loss in a high frequency region than the ceramics condenser.

The second row of the table shown in FIG. 4 represents a comparison between values expressed in percentage, which are the fluctuation ranges of the capacitances within the temperatures of 10 degrees Celsius to 80 degrees Celsius as the temperature dependency of the capacitances of the polyimide condenser and the ceramics condenser. As shown in the second row of the table of FIG. 4, the capacitance of the polyimide condenser fluctuates only by lower than 10% while the capacitance of the ceramics condenser fluctuates by 50%. That is, the polyimide condenser may have the capacitance which is less dependent on temperature than that of the ceramics condenser.

The third row of the table in FIG. 4 represents a comparison in the heatproof temperature between the polyimide condenser and the ceramic condenser. As shown in the third row of the table of FIG. 4, the heatproof temperature of the polyimide condenser may be about 250 degrees Celsius while the heatproof temperature of the ceramics condenser may be about 85 degrees Celsius. In the case of the ceramics condenser, an electric discharge may be easy to be generated between the terminals along the surface of the dielectric, and therefore the surface of the dielectric may need to be covered with electrical insulating resin. The reason why the heatproof temperature of the ceramics condenser is low is that the resin covering the surface of the ceramics dielectric may be easy to be softened due to an increase in the temperature. Therefore, the heatproof temperature of the polyimide condenser may be higher than that of the ceramics condenser.

As described above, the polyimide condenser may be superior to the ceramics condenser in terms of the energy loss, the temperature dependency of the capacitance, and the heat resistance. Therefore, for the gas laser device 1 configured to output a pulsed laser beam at a high repetition frequency, it is preferable to employ the polyimide condenser as a condenser to supply power to the main discharge part 11.

4.2 Basic Structure

Figure 5A:
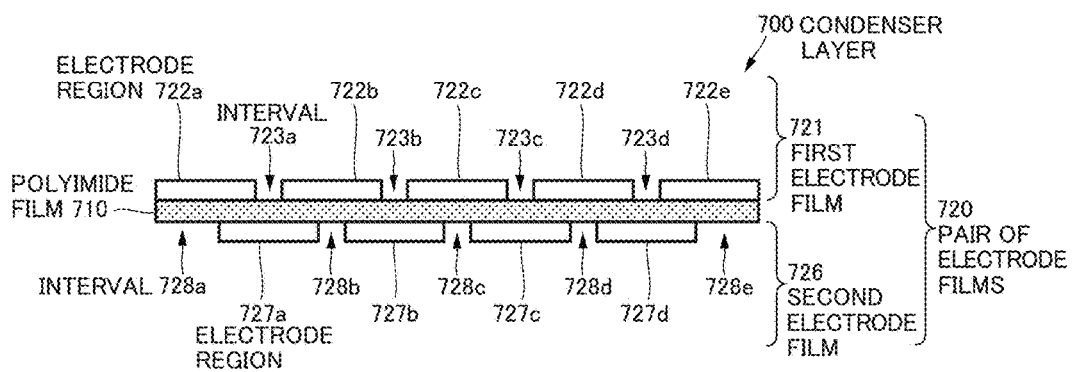
FIG. 5A is a side view explaining the basic structure of the polyimide condenser.
Figure 5B:
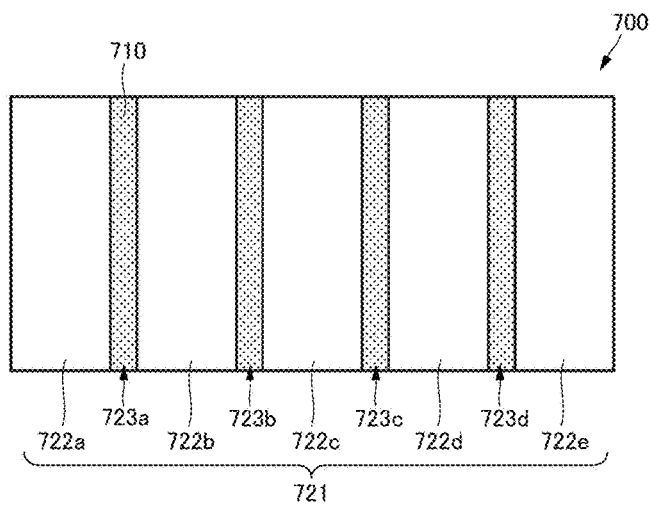
FIG. 5B is a top view explaining the basic structure of the polyimide condenser.
Figure 5C:
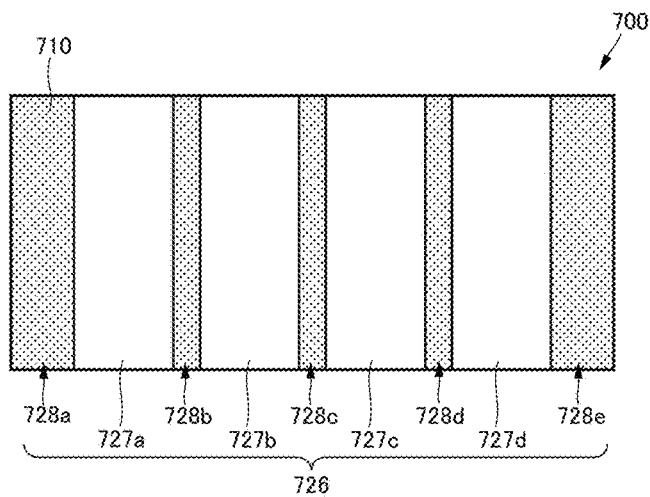
FIG. 5C is a bottom view explaining the basic structure of the polyimide condenser.
Figure 5D:
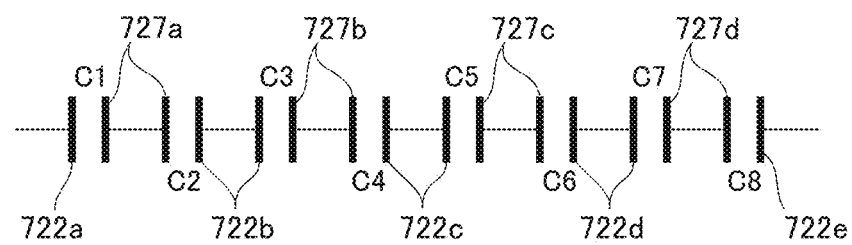
FIG. 5D is an equivalent circuit schematic explaining the basic structure of the polyimide condenser.

With reference to FIGS. 5A to 5D, the basic structure of the polyimide condenser 70 according to the present embodiment will be described. FIG. 5A is a side view explaining the basic structure of the polyimide condenser 70. FIG. 5B is a top view explaining the basic structure of the polyimide condenser 70. FIG. 5C is a bottom view explaining the basic structure of the polyimide condenser 70. FIG. 5D is an equivalent circuit schematic explaining the basic structure of the polyimide condenser 70.

Here, with the present embodiment, the basic structure of the polyimide condenser 70 shown in FIGS. 5A to 5D may be referred to as "condenser layer 700." The condenser layer 700 as the basic structure of the polyimide condenser 70 may include a polyimide film 710 and a pair of electrode films 720.

The polyimide film 710 may constitute a dielectric of the polyimide condenser 70. The polyimide film 710 may have an appropriate rigidity and be formed in a rectangular shape. The thickness of the polyimide film 710 may be, for example, about 5 μm to 25 μm.

The pair of electrode films 720 may constitute the electrodes of the polyimide condenser 70. Each of the pair of electrode films 720 may be made of a conductive material having high heat conductivity such as gold, silver, copper, and aluminum. The pair of electrode films 720 may be formed on the upper surface and the lower surface of the polyimide film 710, respectively, by printing, plating, thermal spraying, evaporation, and so forth. The thickness of each of the pair of electrode films 720 may be, for example, about 5 μm to 20 μm. The pair of electrode films 720 may be disposed to face one another, sandwiching the polyimide film 710 therebetween. The pair of electrode films 720 may include a first electrode film 721 and a second electrode film 726.

The first electrode film 721 may be an electrode film formed on the upper surface or the lower surface of the polyimide film 710. The first electrode film 721 may be divided into a plurality of electrode regions at intervals in a predetermined direction, in the in-plane direction of the polyimide film 710. The number of the divided electrode regions of the first electrode film 721 may be any number of two or more. With the present embodiment, the first electrode film 721 may be divided into a plurality of electrode regions 722a to 722e at intervals 723a to 723d from an end of the polyimide film 710 along the longitudinal direction. The plurality of electrode regions 722a to 722e may have approximately the same shape. Alternatively, the electrode regions 722b to 722d located in the middle of the plurality of electrode regions 722a to 722e may have approximately the same shape. In addition, the electrode regions 722a and 722e located at the opposite ends of the plurality of electrode regions 722a to 722e may each have a width greater than that of each of the electrode regions 722b to 722d in the above-described predetermined direction. The intervals 723a to 723d may be approximately the same length. Each of the intervals 723a to 723d may be sufficiently greater than the thickness of each of the first electrode film 721, the second electrode film 726, and the polyimide film 710. Each of the intervals 723a to 723d may be, for example, about 0.5 mm.

The second electrode film 726 may be formed on the upper surface or the lower surface of the polyimide film 710 on which the first electrode film 721 is not formed. The second electrode film 726 may be divided into a plurality of electrode regions at intervals in the above-described predetermined direction, in the in-plane direction of the polyimide film 710. The number of the divided electrode regions of the second electrode film 726 may be one less than the number of the divided electrode regions of the first electrode film 721. With the present embodiment, the second electrode film 726 may be divided into a plurality of electrode regions 727a to 727d at intervals 728a to 728e from an end of the polyimide film 710 along the longitudinal direction. The plurality of electrode regions 727a to 727d may have approximately the same shape as the plurality of electrode regions 722a to 722e of the first electrode film 721. The intervals 728b to 728d located in the middle of the intervals 728a to 728e may each have approximately the same length as each of the intervals 723a to 723d of the first electrode film 721. The intervals 728a and 728e located at the opposite ends of the intervals 728a to 728e may each have a length longer than each of the intervals 728b to 728d in the above-described predetermined direction. The intervals 728a to 728e may each have a sufficiently greater length than the thickness of each of the first electrode film 721, the second electrode film 726, and the polyimide film 710. Each of the intervals 728a to 728e may be, for example, about 0.5 mm.

Part of each of the pair of electrode films 720 may face one another via the polyimide film 710. To be specific, respective parts of the plurality of electrode regions 722a to 722e of the first electrode film 721 may face respective parts of the plurality of electrode regions 727a to 727d of the second electrode film 726 via the polyimide film 710.

To be more specific, respective parts of the plurality of electrode regions 722a to 722e of the first electrode film 721 may face respective parts of the plurality of electrode regions 727a to 727d of the second electrode film 726 via the polyimide film 710 as follows. Part of the electrode region 722a of the first electrode film 721 on the interval 723a side may face part of the electrode region 727a of the second electrode film 726 on the interval 728a side via the polyimide film 710. The part of the electrode region 722a on the interval 723a side, the part of the electrode region 727a on the interval 728a side, and the part of the polyimide film 710 sandwiched between them may constitute one condenser C1 as shown in FIG. 5D. Part of the electrode region 722b of the first electrode film 721 on the interval 723a side may face part of the electrode region 727a of the second electrode film 726 on the interval 728b side via the polyimide film 710. The part of the electrode region 722b on the interval 723a side, the part of the electrode region 727a on the interval 728b side, and the part of the polyimide film 710 sandwiched between them may constitute one condenser C2 as shown in FIG. 5D. Part of the electrode region 722b of the first electrode film 721 on the interval 723b side may face part of the electrode region 727b of the second electrode film 726 on the interval 728b side via the polyimide film 710. The part of the electrode region 722b on the interval 723b side, the part of the electrode region 727b on the interval 728b side, and the part of the polyimide film sandwiched between them may constitute one condenser C3 as shown in FIG. 5D. Part of the electrode region 722c of the first electrode film 721 on the interval 723b side may face part of the electrode region 727b of the second electrode film 726 on the interval 728c side via the polyimide film 710. The part of the electrode region 722c on the interval 723b side, the part of the electrode region 727b on the interval 728c side, and the part of the polyimide film 710 sandwiched between them may constitute one condenser C4 as shown in FIG. 5D. Part of the electrode region 722c of the first electrode film 721 on the interval 723c side may face part of the electrode region 727c of the second electrode film 726 on the interval 728c side via the polyimide film 710. The part of the electrode region 722c on the interval 723c side, the part of the electrode region 727c on the interval 728c side, and the part of the polyimide film 710 sandwiched between them may constitute one condenser C5 as shown in FIG. 5D. Part of the electrode region 722d of the first electrode film 721 on the interval 723c side may face part of the electrode region 727c of the second electrode film 726 on the interval 728d side via the polyimide film 710. The part of the electrode region 722d on the interval 723c side, the part of the electrode region 727c on the interval 728d side, and the part of the polyimide film 710 sandwiched between them may constitute one condenser C6 as shown in FIG. 5D. Part of the electrode region 722d of the first electrode film 721 on the interval 723d side may face part of the electrode region 727d of the second electrode film 726 on the interval 728d side via the polyimide film 710. The part of the electrode region 722d on the interval 723d side, the part of the electrode region 727d on the interval 728d side, and the part of the polyimide film 710 sandwiched between them may constitute one condenser C7 as shown in FIG. 5D. Part of the electrode region 722e of the first electrode film 721 on the interval 723d side may face part of the electrode region 727d of the second electrode film 726 on the interval 728e side via the polyimide film 710. The part of the electrode region 722e on the interval 723d side, the part of the electrode region 727d on the interval 728e side, and the part of the polyimide film 710 sandwiched between them may constitute one condenser C8 as shown in FIG. 5D.

In this way, the pair of electrode films 720 may be formed to face one another such that respective parts of the plurality of electrode regions 722a to 722e of the first electrode film 721 face respective parts of the plurality of electrode regions 727a to 727d of the second electrode film 726 via the polyimide film 710. By this means, the condenser layer 700 including the pair of electrode films 720 and the polyimide film 710 can constitute the condensers C1 to C8 connected in series as shown in FIG. 5D. Therefore, the condenser layer 700 can increase the dielectric withstanding voltage of the polyimide condenser 70 including the condenser layer 700. The dielectric withstanding voltage of the polyimide condenser 70 may be, for example, about 10 kV to 50 kV.

When a voltage is applied to between the electrode region 722a and the electrode region 722e located at the opposite ends of the first electrode film 721 of the condenser layer 700, electric energy may be accumulated in the condensers C1 to C8. After that, when the application of the voltage between the electrode region 722a and the electrode region 722e is stopped, the electric energy accumulated in the condensers C1 to C8 of the condenser layer 700 may be discharged. That is, the polyimide condenser 70 including the condenser layer 700 may be repeatedly charged and discharged via the electrode region 722a and the electrode region 722e located at the opposite ends of the first electrode film 721 as electrode terminals.

In addition, the number of condensers connected in series of the condenser layer 700 may be appropriately changed by changing the number of electrode regions of the first electrode film 721 and the second electrode film 726. By this means, the polyimide condenser 70 including the condenser layer 700 can realize a desired dielectric withstanding voltage with a simple design change. The number of condensers of the condenser layer 700 may be, for example, 8 to 20.

Then, as described with reference to FIG. 4, the polyimide is employed for the dielectric of the polyimide condenser 70 including the condenser layer 700, because it is superior in terms of the energy loss, the temperature dependency of the capacitance, and the heat resistance.

As described above, the polyimide dielectric employed in the polyimide condenser 70 is superior in terms of the energy loss, the temperature dependency of the capacitance, and the heat resistance, and therefore the polyimide condenser 70 can improve the performance on the dielectric withstanding voltage with a simple configuration. Accordingly, the polyimide condenser 70 can consistently provide superior performance in the gas laser device 1 configured to output a pulsed laser bean at a high repetition frequency, and therefore is desirable as the peaking condenser to supply power to the main discharge part 11.

4.3 Structure of a Multi-Layered Condenser

Figure 6A:
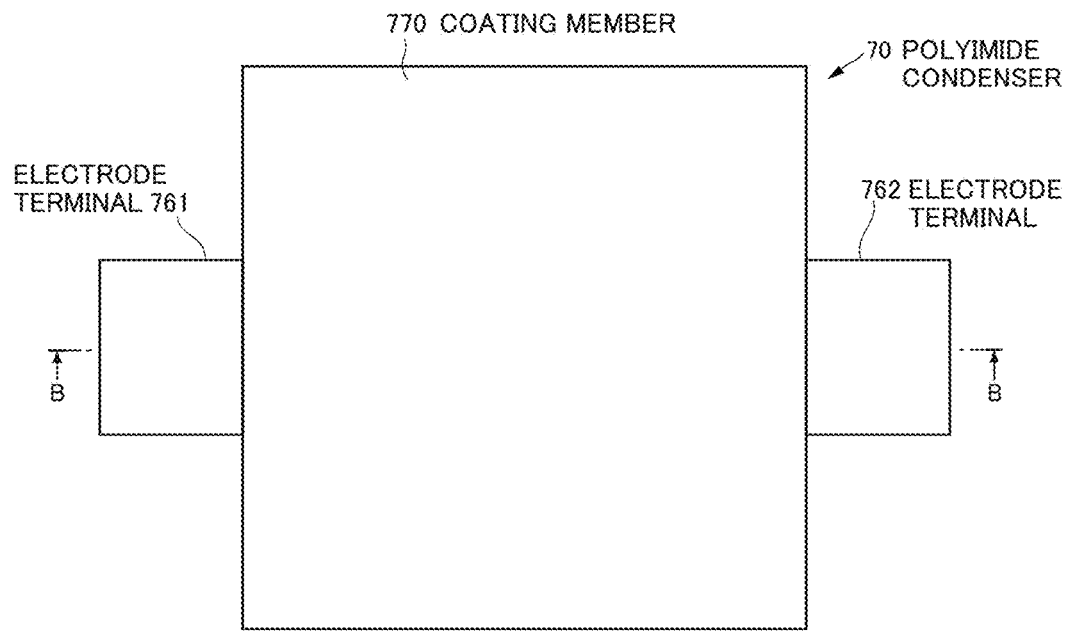
FIG. 6A is a top view explaining the polyimide condenser formed by laminating a plurality of condenser layers each having the basic structure shown in FIGS. 5A to 5D.
Figure 6B:
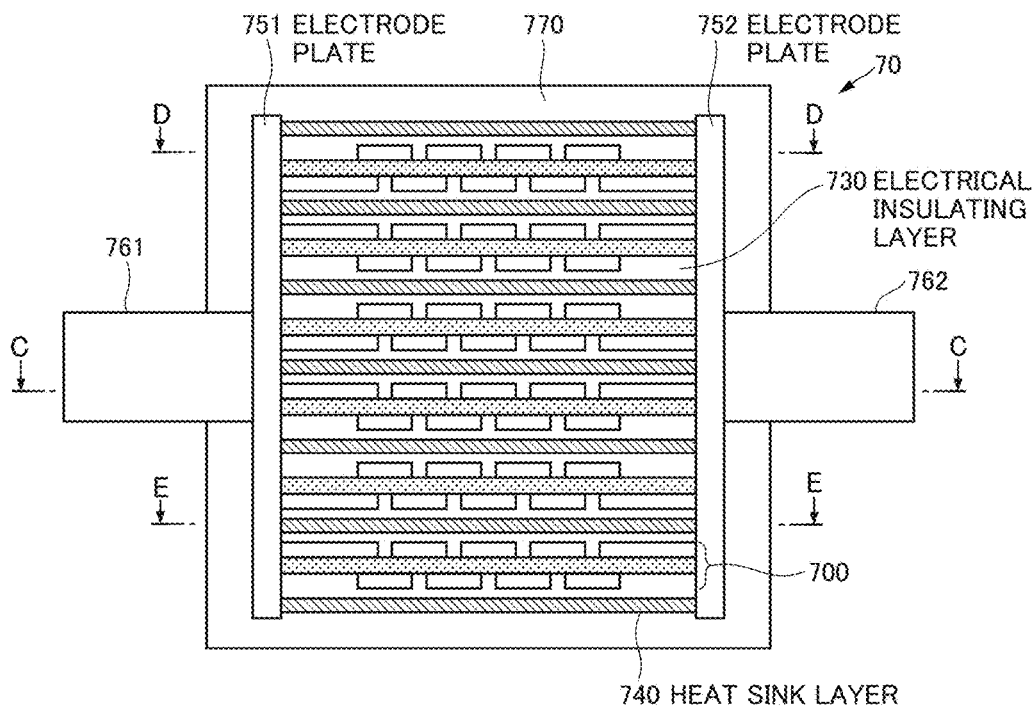
FIG. 6B is a cross-sectional view explaining the polyimide condenser formed by laminating the plurality of condenser layers each having the basic structure shown in FIGS. 5A to 5D, taken along line B-B shown in FIG. 6A.
Figure 6C:
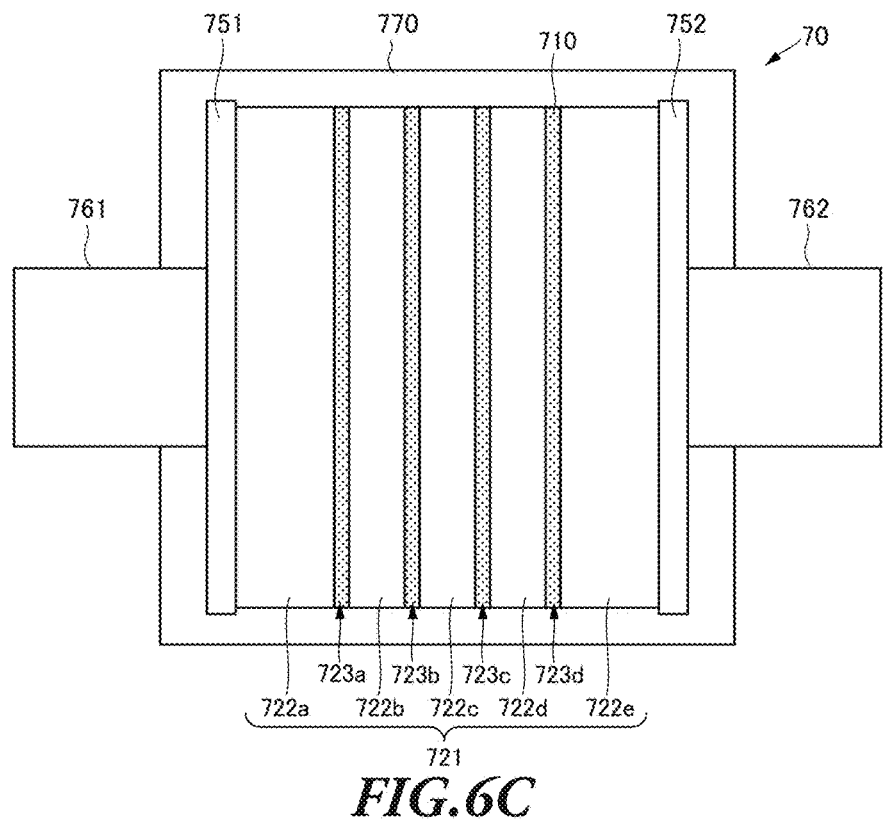
FIG. 6C is a cross-sectional view explaining the polyimide condenser formed by laminating the plurality of condenser layers each having the basic structure shown in FIGS. 5A to 5D, taken along line C-C shown in FIG. 6B.
Figure 6D:
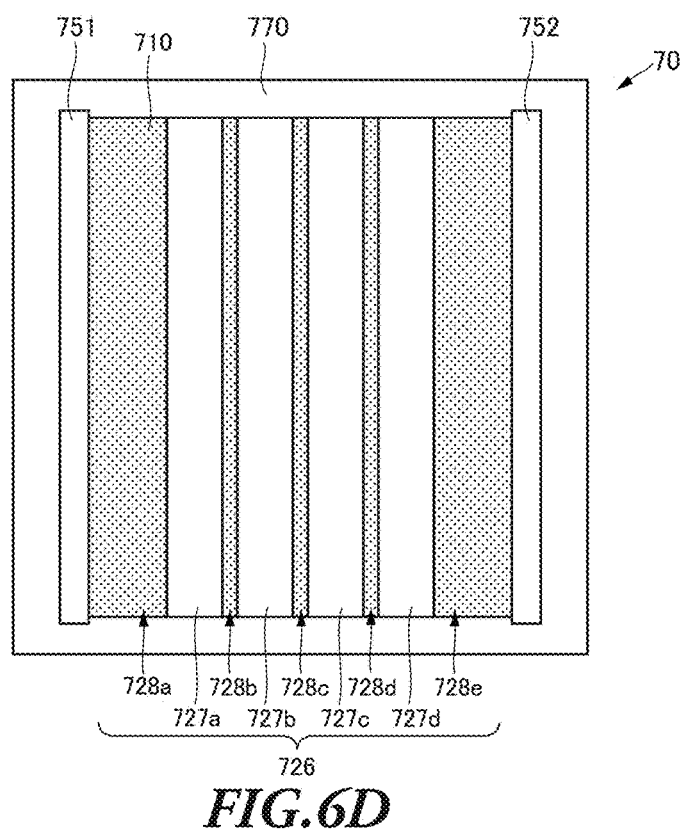
FIG. 6D is a cross-sectional view explaining the polyimide condenser formed by laminating the plurality of condenser layers each having the basic structure shown in FIGS. 5A to 5D, taken along line D-D shown in FIG. 6B.
Figure 6E:
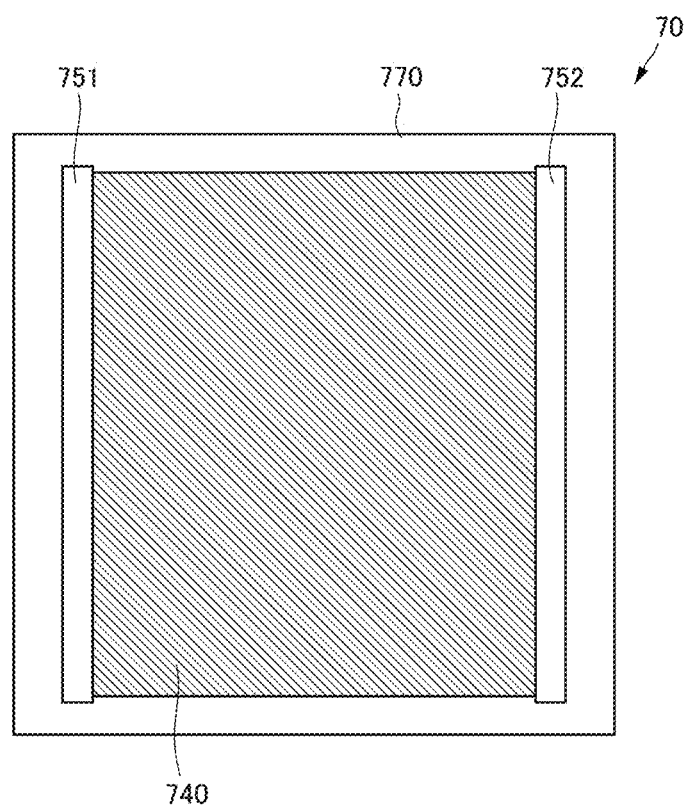
FIG. 6E is a cross-sectional view explaining the polyimide condenser formed by laminating the plurality of condenser layers each having the same basic structure shown in FIGS. 5A to 5D, taken along line E-E shown in FIG. 6B.

Now, with reference to FIGS. 6A to 6E, the structure of the multi-layered polyimide condenser 70 will be described. FIG. 6A is a top view explaining the polyimide condenser 70 formed by laminating a plurality of condenser layers 700 each having the basic structure shown in FIGS. 5A to 5D. FIG. 6B is a cross-sectional view explaining the polyimide condenser 70 formed by laminating the plurality of condenser layers 700 each having the basic structure shown in FIGS. 5A to 5D, taken along line B-B shown in FIG. 6A. FIG. 6C is a cross-sectional view explaining the polyimide condenser 70 formed by laminating the plurality of condenser layers 700 each having the basic structure shown in FIGS. 5A to 5D, taken along line C-C shown in FIG. 6B. FIG. 6D is a cross-sectional view explaining the polyimide condenser 70 formed by laminating the plurality of condenser layers 700 each having the basic structure shown in FIGS. 5A to 5D, taken along line D-D shown in FIG. 6B. FIG. 6E is a cross-sectional view explaining the polyimide condenser 70 formed by laminating the plurality of condenser layers 700 each having the basic structure shown in FIGS. 5A to 5D, taken along line E-E shown in FIG. 6B.

The polyimide condenser 70 may be formed by only the single condenser layer 700 having the basic structure shown in FIGS. 5A to 5D. Alternatively, the polyimide condenser 70 may be formed by laminating the plurality of condenser layers 700 each having the basic structure shown in FIGS. 5A to 5D. By laminating the plurality of condenser layers 700, it is possible to increase the capacitance of the polyimide condenser 70. The configuration of the multi-layered polyimide condenser 70, which is the same as that of the polyimide condenser 70 shown in FIGS. 5A to 5E, will not be described again here.

The multi-layered polyimide condenser 70 may include the plurality of condenser layers 700, a plurality of electrical insulating layers 730, a plurality of heat sink layers 740, electrode plates 751 and 752, electrode terminals 761 and 762, and a coating member 770. The plurality of condenser layers 700, the plurality of electrical insulating layers 730, and the plurality of heat sink layers 740 may be arranged in approximately parallel to each other.

The plurality of condenser layers 700 may be laminated in their thickness direction. Each of the plurality of condenser layers 700 may be laminated in approximately parallel to each other. Two adjacent condenser layers of the plurality of condenser layers 700 may be laminated such that the surface of the first electrode film 721 of one condenser layer 700 faces the surface of the first electrode film 721 of the adjacent condenser layer 700, or the surface of the second electrode film 726 of one condenser layer 700 faces the surface of the second electrode film 726 of the adjacent condenser layer 700. For example, the first condenser layer 700 which is the top of the condenser layers 700 shown in FIG. 6B and the second condenser layer 700 located below the first condenser layer 700 may be two adjacent condenser layers 700. In addition, the surface of the first electrode film 721 of the first condenser layer 700 may face the surface of the first electrode film 721 of the second condenser layer 700 via the electrical insulating layer 730 and the heat sink layer 740.

By laminating the plurality of condenser layers 700 in this way, two adjacent condenser layers 700 face one another such that the surface of the first electrode film 721 of one condenser layer 700 faces the surface of the first electrode film 721 of the adjacent condenser layer 700, or the surface of the second electrode film 726 of one condenser layer 700 faces the surface of the second electrode film 726 of the adjacent condenser layer 700. Therefore, the electrode regions of adjacent two of the plurality of condenser layers 700, which have approximately the same potential, may face one another. Accordingly, it is possible to prevent short circuit between the electrode films of two adjacent condenser layers 700. The other configuration of the plurality of condenser layers 700 may be the same as the configuration of the condenser layer 700 shown in FIGS. 5A to 5D.

The plurality of electrical insulating layers 730 may be formed by using a material which has heat resistance and electrical insulation and can adhere tightly to the condenser layers 700. For example, the plurality of electrical insulating layers 730 may be formed by using silicone resin. The thickness of each of the plurality of electrical insulating layers 730 may be, for example, about 20 µm to 100 µm.

The plurality of electrical insulating layers 730 may cover the surfaces of the first electrode films 721 and the surfaces of the second electrode films 726 of the plurality of condenser layers 700, respectively. The plurality of electrical insulating layers 730 may cover the surfaces of the plurality of electrode regions 722a to 722e of the first electrode films 721 of the plurality of condenser layers 700, respectively. In this case, the plurality of electrical insulating layers 730 may cover the surfaces of the electrode regions 722a to 722e so as to fill the intervals 723a to 723d of the first electrode films 721 of the plurality of condenser layers 700, respectively. The plurality of electrical insulating layers 730 may cover the surfaces of the plurality of electrode regions 727a to 727d of the second electrode films 726 of the plurality of condenser layers 700, respectively. In this case, the plurality of electrical insulating layers 730 may cover the surfaces of the plurality of electrode regions 727a to 727d so as to fill the intervals 728a to 728e of the second electrode films 726 of the plurality of condenser layers 700, respectively. The plurality of electrical insulating layers 730 may be arranged in approximately parallel to each other.

With the above-described configuration, the plurality of electrical insulating layers 730 can insulate the facing electrode films of two adjacent condenser layers 700 from one another. By this means, the plurality of electrical insulating layers 730 can prevent short circuit between the electrode films of two adjacent condenser layers 700. In addition, the plurality of electrical insulating layers 730 can insulate between adjacent ones of the plurality of electrode regions 722a to 722e of the first electrode films 721 of the plurality of condenser layers 700, respectively. In addition, the plurality of electrical insulating layers 730 can insulate between adjacent ones of the plurality of electrode regions 727a to 727d of the second electrode films 726 of the plurality of condenser layers 700, respectively. By this means, the plurality of electrical insulating layers 730 can prevent short circuit between adjacent ones of the plurality of electrode regions 722a to 722e of the first electrode films 721 of the plurality of condenser layers 700, respectively. In addition, the plurality of electrode insulating layers 730 can prevent short circuit between adjacent ones of the plurality of electrode regions 727a to 727d of the second electrode films 726 of the plurality of condenser layers 700, respectively.

The plurality of heat sink layers 740 may be formed by using a material having high heat conductivity and high electrical insulation. For example, the plurality of heat sink layers 740 may be formed by using at least one of alumina, aluminum nitride, diamond, and diamond-like carbon. The thickness of each of the plurality of heat sink layers 740 may be, for example, about 400 µm to 1000 µm. If the plurality of heat sink layers 740 are made of a material having higher heat conductivity and higher electrical insulation, the thickness of each of the plurality of heat sink layers 740 may be, for example, about 200 µm.

The plurality of heat sink layers 740 may be disposed between the plurality of condenser layers 700, respectively. Each of the plurality of heat sink layers 740 may be disposed between two adjacent electrical insulating layers 730, covering the facing electrode films of the two adjacent condenser layers 700. Here, the electrical insulating layers 730 may be elastic bodies such as silicone resin as described above, and be provided to adhere tightly to the condenser layers 700 and the heat sink layers 740, respectively. For example, the electrical insulating layer 730 covering the first electrode film 721 of the first condenser layer 700 which is the top of the plurality of condenser layers 700 shown in FIG. 6B and the electrical insulating layer 730 covering the first electrode film 721 of the second condenser layer 700 may be two adjacent electrical insulating layers 730. Then, the heat sink layer 740 may be disposed between the two adjacent electrical insulating layers 730. When the electrical insulating layer 730 is an elastic body, the condenser layer 700 and the heat sink layer 740 may be close to one another via the electrical insulating layer 730 even if the condenser layer 700 and heat sink layer 740 are different in the coefficient of linear thermal expansion from one another. Therefore, the electrical insulating layer 730 as an elastic body can prevent a decrease in the efficiency of transferring the heat generated in the condenser layer 700 to the heat sink layer 740. Moreover, the heat sink layers 740 may be disposed respectively on the outside of the two outermost condenser layers 700 of the plurality of condenser layers 700. For example, the first condenser layer 700 which is the top of the plurality of condenser layers 700 shown in FIG. 6B may be the outermost one of the plurality of condenser layers 700. Then, the heat sink layer 740 may be disposed above the first condenser layer 700. In addition, the sixth condenser layer 700 which is the bottom of the plurality of condenser layers 700 shown in FIG. 6B may be the outermost one of the plurality of condenser layers 700. Then, the heat sink layer 740 may be disposed below the sixth condenser layer 700. The plurality of heat sink layers 740 may be disposed in approximately parallel to each other.

With the above-described configuration, the plurality of heat sink layers 740 can insulate between the facing electrode films of adjacent two of the plurality of condenser layers 700. By this means, each of the plurality of electrical insulating layers 730 can more effectively prevent short circuit between the electrode films of adjacent two of the plurality of condenser layers 700. In addition, each of the plurality of heat sink layers 740 can absorb the heat generated in the condenser layer 700 adjacent to each of the heat sink layers 740 by heat conduction. In particular, some of the plurality of heat sink layers 740 are each disposed between two adjacent condenser layers 700 and the others are each disposed on the outside of the outermost two of the plurality of condenser layers 700, and therefore can prevent thermal interference among the plurality of condenser layers 700 generating heat. By this means, the plurality of heat sink layers 740 can prevent the increase in the temperature of the plurality of condenser layers 700, substantially equalizing the temperature distributions of the plurality of condenser layers 700.

The electrode plates 751 and 752 may be formed by using a metallic material having high heat conductivity and high electrical conductivity. For example, the electrode plates 751 and 752 may be formed by using copper or aluminum. The plurality of condenser layers 700, the plurality of electrical insulating layers 730, and the plurality of heat sink layers 740 may be sandwiched between the electrode plates 751 and 752. To be more specific, the side surfaces of these layers laminated as described above may be sandwiched between the electrode plates 751 and 752. The electrode plates 751 and 752 may be formed such that the in-plane direction of the electrode plates 751 and 752 is approximately parallel to the direction in which the plurality of condenser layers 700 are laminated.

The electrode region 722a located on one end of each of the first electrode films 721 of the plurality of condenser layers 700 may be electrically connected to the electrode plate 751. The electrode region 722e located on the other end of each of the first electrode films 721 of the plurality of condenser layers 700 may be electrically connected to the electrode plate 752. By this means, the electrode plates 751 and 752 may electrically connect the plurality of condenser layers 700 in parallel to each other. The opposite ends of each of the plurality of heat sink layers 740 may be thermally connected to the electrode plates 751 and 752, respectively. In this case, a material which is the same as that of the electrode plates 751 and 752 may be applied in advance to the both ends of each of the plurality of heat sink layers 740 by thermal spray. By this means, it is possible to reduce the contact thermal resistance between the electrode plate 751 and one end of each of the heat sink layers 740, and also the contact thermal resistance between the electrode plate 752 and the other end of each of the heat sink layers 740. Therefore, it is possible to efficiently transfer the heat absorbed into the plurality of heat sink layers 740 to the electrode plates 751 and 752 by heat conduction.

The electrode terminals 761 and 762 may be electrically and thermally connected to the electrode plates 751 and 752, respectively. The electrode terminals 761 and 762 may be formed by using a material which is the same as that of the electrode plates 751 and 752. The electrode terminal 761 may be integrally formed with the electrode plate 751. The electrode terminal 762 may be integrally formed with the electrode plate 752. The electrode terminals 761 and 762 may be formed to extend in the direction approximately perpendicular to the direction in which the plurality of condenser layers 700 are laminated. By this means, the electrode terminals 761 and 762 may constitute the electrode terminals of the polyimide condenser 70. In addition, it is possible to more efficiently transfer the heat absorbed into the plurality of heat sink layers 740 and then transferred to the electrode plates 751 and 752, to the electrode terminals 761 and 762 by heat conduction. Here, when the electrode terminals 761 and 762 are thermally connected to a cooling mechanism such as a refrigerant flow path, the heat may be furthermore efficiently transferred to the electrode terminals 761 and 762.

The coating member 770 may be formed by using a resin material having electrical insulation. For example, the coating member 770 may be formed by using epoxy resin. The coating member 770 may entirely cover the polyimide condenser 70 except the electrode terminals 761 and 762. By this means, the coating member 770 can electrically insulate the inside of the polyimide condenser 70 from the outside.

With the above-described configuration of the polyimide condenser 70, when a voltage is applied to between the electrode terminals 761 and 762, electric energy can be accumulated in each of the plurality of condenser layers 700. After that, when the application of the voltage to between the electrode terminals 761 and 762 is stopped, the electric energy accumulated in the plurality of condenser layers 700 of the polyimide condenser 70 may be discharged. That is, the polyimide condenser 70 may be repeatedly charged and discharged via the electrode terminals 761 and 762. As the polyimide condenser 70 is repeatedly charged and discharged, the plurality of condenser layers 700 of the polyimide condenser 70 may generate heat. The heat generated in the plurality of condenser layers 700 may be absorbed into the plurality of heat sink layers 740. In particular, with the above-described configuration of the plurality of heat sink layers 740, it is possible to absorb the heat generated in the plurality of condenser layers 700 into the plurality of heat sink layers 740, preventing heat interference among the plurality of condenser layers 700 generating heat. The heat absorbed into the plurality of heat sink layers 740 may be transferred to the electrode terminals 761 and 762 via the electrode plates 751 and 752. The heat transferred to the electrode terminals 761 and 762 may be transferred to the cooling mechanism connected to the electrode terminals 761 and 762, and then discharged to the outside of the polyimide condenser 70. By this means, it is possible to prevent the increase in the temperature of the polyimide condenser 70. The temperature of the polyimide condenser 70 may be maintained at, for example, 80 degrees Celsius or lower.

In addition, it is possible to appropriately change the number of condensers connected in parallel in the polyimide condenser 70 by changing the number of the condenser layers 700. By this means, it is possible to achieve a desired capacitance of the polyimide condenser 70 by a simple design change. The number of the plurality of condenser layers 700 of the polyimide condenser 70 may be, for example, 16 to 24. When the capacitance of the polyimide condenser 70 is approximately the same as that of the peaking condenser 60, the size of the polyimide condenser 70 may be smaller than that of the peaking condenser 60.

As described above, the polyimide condenser 70 employs the polyimide dielectric, and therefore can ensure the superiority in terms of the energy loss, the temperature dependency of the capacitance, the heat resistance and so forth; improve the performance on the dielectric withstanding voltage with a simple configuration; easily increase the capacitance by the multi-layered configuration; and effectively prevent the increase in temperature. Accordingly, the polyimide condenser 70 can consistently provide high performance in the gas laser device 1 configured to output a pulsed laser beam at a high repetition frequency, and therefore be desirable for the peaking condenser to supply power to the main discharge part 11.

Here, even when the polyimide condenser 70 includes only the single condenser layer 700 as shown in FIGS. 5A to 5D, the polyimide condenser 70 may include the electric insulating layers 730, the heat sink layers 740, the electrode plates 751 and 752, the electrode terminals 761 and 762, and the coating member 770. In this case, the electrical insulating layers 730 may cover the surfaces of the first electrode film 721 and the second electrode film 726 of the single condenser layer 700. The heat sink layers 740 may be disposed on the outside of the first electrode film covered with the electrical insulating layer 730 and on the outside of the second electrode film 726 covered with the electrical insulating layer 730, respectively. The side surfaces of the condenser layer 700, the electrical insulating layers 730, and the heat sink layers 740 which are laminated may be sandwiched between the electrode plates 751 and 752. The electrode terminals 761 and 762 may be connected to the electrode plates 751 and 752, respectively. The coating member 770 may entirely cover the polyimide condenser 70 except the electrode terminals 761 and 762.

5. Polyimide Condenser Applied to a Charging Condenser

Now, with reference to FIGS. 7A and 7B, the polyimide condenser 70 applied to a charging condenser will be described. As described above, the polyimide condenser 70 shown in FIGS. 5A to 6E has the configuration in the case where the polyimide condenser 70 is applied to the peaking condenser to supply power to the main discharge part 11. The charging condenser of the PPM 13 may charge the peaking condenser with the electric energy received from the charger 12, via a condenser for pulse compression. Due to the discharge from the charged peaking condenser, a pulse voltage may be applied to the main discharge part 11. That is, like the peaking condenser, the charging condenser of the PPM 13 may be a condenser to supply power to the main discharge part 11. The polyimide condenser 70 may also be applicable to the charging condenser of the PPM 13. The charging condenser does not need a dielectric withstanding voltage as high as that of the peaking condenser. Therefore, the polyimide condenser 70 applied to the charging condenser may have lower performance on the dielectric withstanding voltage than the polyimide condenser 70 applied to the peaking condenser. The configuration of the polyimide condenser 70 applied to the charging condenser, which is the same as that of the polyimide condenser 70 shown in FIGS. 5A to 6E, will not be described again here.

Figure 7A:
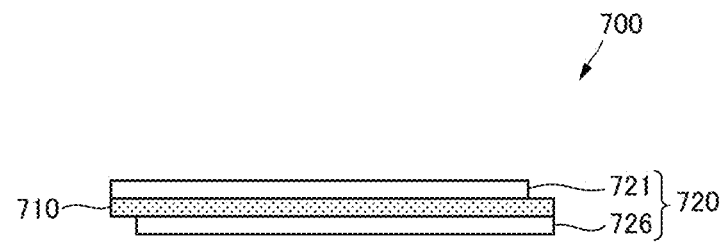
FIG. 7A is a drawing explaining the basic structure of the polyimide condenser applied to a charging condenser.

FIG. 7A is a drawing explaining the basic structure of the polyimide condenser 70 applied to the charging condenser. Here, with the present embodiment, the basic structure of the polyimide condenser 70 shown in FIG. 7A may be referred to as "condenser layer 700" in the same way as in FIGS. 5A to 6E. The condenser layer 700 which is the basic structure of the polyimide condenser 70 applied to the charging condenser may include the polyimide film 710 and the pair of electrode films 720.

The thickness of the polyimide film 710 may be, for example, about 5 μm to 25 μm. Preferably, the thickness of the polyimide film 710 may be, for example, about 12.5 μm.

The first electrode film 721 and the second electrode film 726 of the pair of electrode films 720 may be made of a conductive material having high heat conductivity such as gold, silver, copper and aluminum. Preferably, the first electrode film 721 and the second electrode film 726 may be formed by using copper. The thickness of each of the first electrode film 721 and the second electrode film 726 may be, for example, about 5 µm to 20 µm. Preferably, the thickness of each of the first electrode film 721 and the second electrode film 726 may be, for example, 10 µm.

Each of the first electrode film 721 and the second electrode film 726 may not be divided into the plurality of electrode regions, unlike the pair of electrode films 720 shown in FIGS. 5A to 6E. Each of the first electrode film 721 and the second electrode film 726 may be substantially even as shown in FIG. 7A. Part of the first electrode film 721 and part of the second electrode film 726 may face one another via the polyimide film 710. The condenser layer 700 including the pair of electrode films 720 and the polyimide film 710 may constitute one condenser. In this case, the capacitance of one condenser constituted by one condenser layer 700 may be greater than that of one condenser layer 700 shown in FIGS. 5A to 6E, because each of the pair of electrode films 720 is substantially even. Here, the other configuration of the condenser layer 700 may be the same as the configuration of the condenser layer 700 shown in FIGS. 5A to 6E.

Figure 7B:
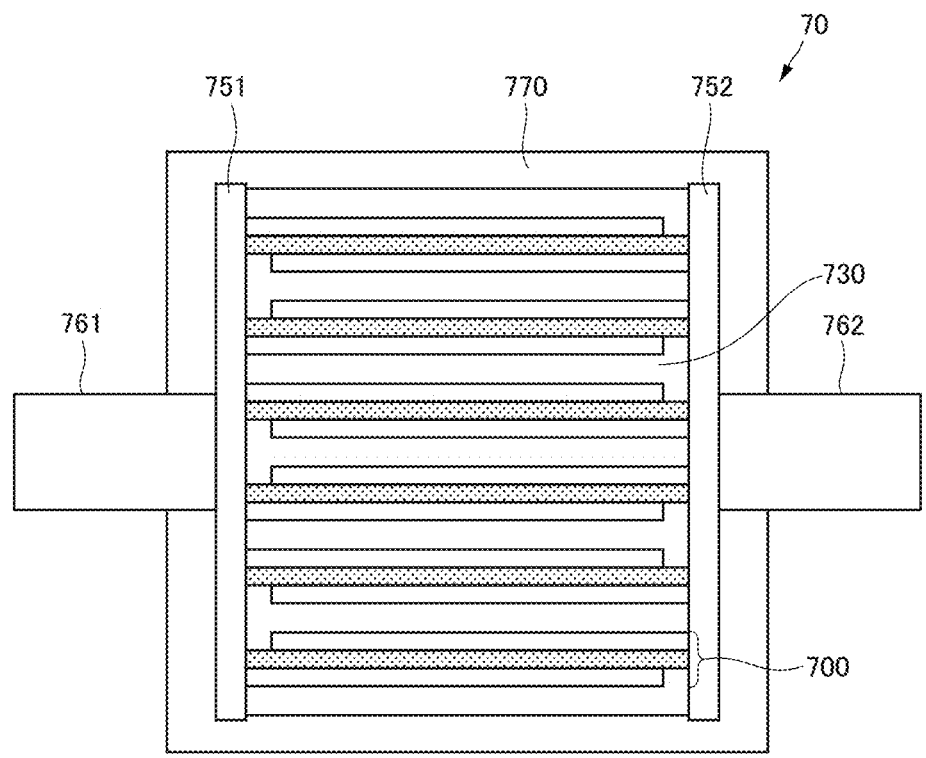
FIG. 7B is a drawing explaining the polyimide condenser formed by laminating a plurality of condenser layers each having the basic structure shown in FIG. 7A.

FIG. 7B is a drawing explaining the polyimide condenser 70 formed by laminating a plurality of condenser layers 700 having the basic structure shown in FIG. 7A. The multi-layered polyimide condenser 70 may include the plurality of condenser layers 700, a plurality of electric insulating layers 730, the electrode plates 751 and 752, the electrode terminals 761 and 762, and the coating member 770. The polyimide condenser 70 shown in FIG. 7B may not include the plurality of heat sink layers 740, unlike the polyimide condenser 70 shown in FIGS. 5A to 6E.

One end of the first electrode film 721 of each of the plurality of condenser layers 700 may be electrically and thermally connected to the electrode plate 751. One end of the second electrode film 726 of each of the plurality of condenser layers 700 may be electrically and thermally connected to the electrode plate 752.

The thickness of each of the plurality of electrical insulating layers 730 may be, for example, about 20 µm to 100 µm. Preferably, the thickness of each of the plurality of electrical insulating layers 730 may be, for example 70 µm. The other configuration of the polyimide condenser 70 may be the same as the configuration of the polyimide condenser 70 shown in FIGS. 5A to 6E.

With the above-described configuration, the polyimide condenser 70 can be repeatedly charged and discharged via the electrode terminals 761 and 762, in the same way as the polyimide condenser 70 shown in FIGS. 5A to 6E. As the polyimide condenser 70 is repeatedly charged and discharged, the plurality of condenser layers 700 of the polyimide condenser 70 may generate heat. The heat generated in the plurality of condenser layers 700 may be transferred to the pair of electrode films 720 of each of the plurality of condenser layers 700, and absorbed into the electrode plates 751 and 752. This is because the first electrode film 721 and the second electrode film 726 of the pair of electrode films 720 are not divided, and are substantially even. Accordingly, the polyimide condenser 70 may not include more than one heat sink layers 740. The heat absorbed into the electrode plates 751 and 752 may be transferred to the electrode terminals 761 and 762. The heat transferred to the electrode terminals 761 and 762 may be transferred to the cooling mechanism connected to the electrode terminals 761 and 762, and then discharged to the outside of the polyimide condenser 70. By this means, it is possible to prevent the increase in the temperature of the polyimide condenser 70.

As described above, as compared to the polyimide condenser 70 shown in FIGS. 5A to 6E, the polyimide condenser 70 shown in FIG. 7B can ensure the superiority in terms of the energy loss, the temperature dependency of the capacitance, the heat resistance and so forth; increase the capacitance with a simpler configuration; and prevent the increase in temperature. Therefore, the polyimide condenser 70 can consistently provide high performance in the gas laser device 1 configured to output a pulsed laser beam at a high repetition frequency, and consequently also be desirable for the charging condenser to supply power to the main discharge part 11.

Here, the multi-layered configuration of the polyimide condenser 70 applied to the charging condenser is not limited to the configuration shown in FIG. 7B where the plurality of condenser layers 700 are laminated. For example, the polyimide films 710 of the plurality of condenser layers 700 may be connected to be formed as one sheet. This sheet-like polyimide film 710 may have a width of 50 mm to 100 mm and a length of 1000 mm to 2000 mm. A plurality of pairs of electrode films 720 may be formed on the upper surface and the lower surface of the sheet-like polyimide film 710. Then, the polyimide condenser 70 applied to the charging condenser may be formed as a multi-layered condenser by accordion-folding or rolling up the polyimide film 710 including the plurality of pairs of electrode films 720.

6. Gas Laser Device Including the Polyimide Condenser

Figure 8:
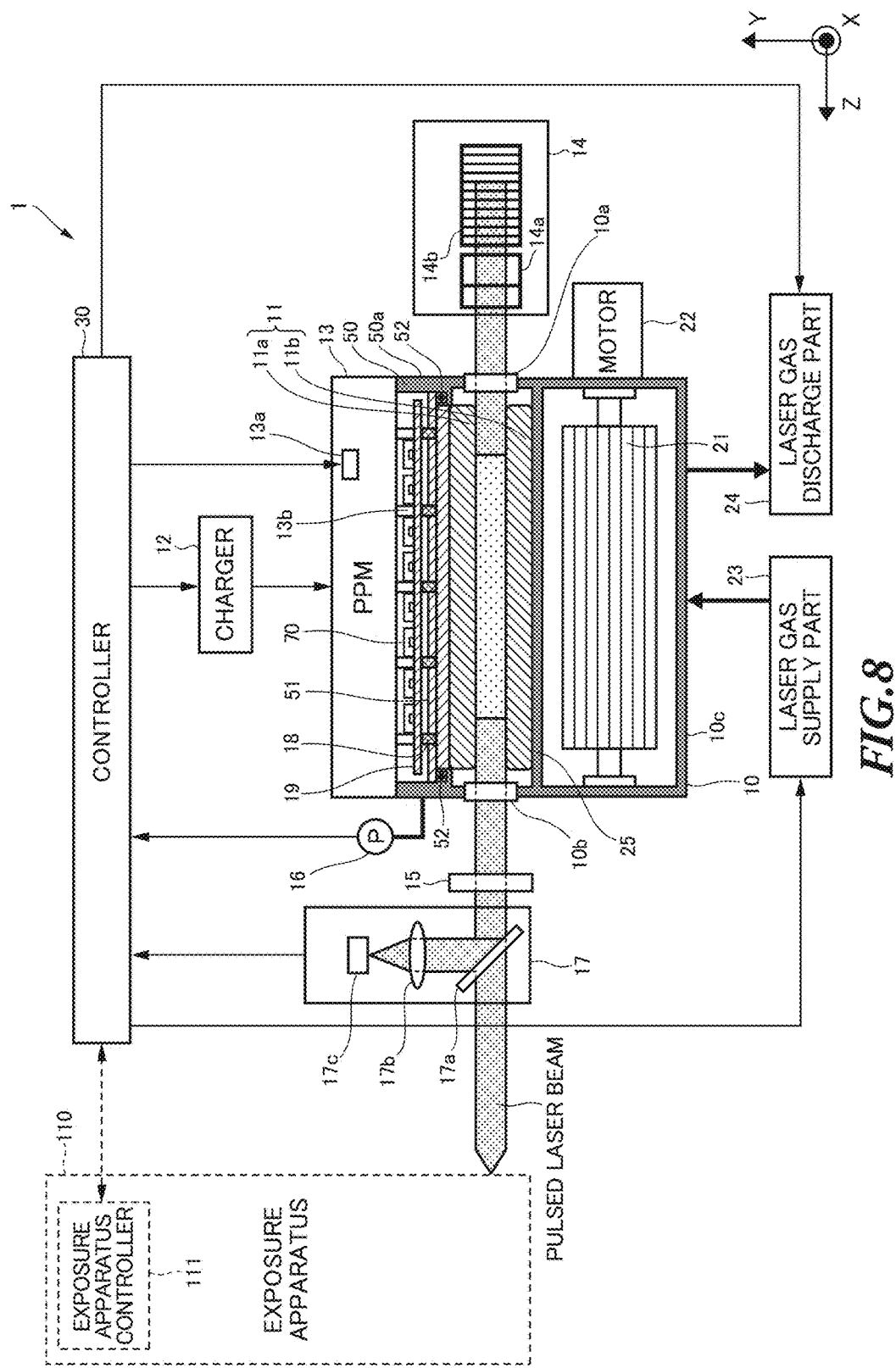
FIG. 8 is a drawing explaining the configuration of a gas laser device including the polyimide condenser.
Figure 9:
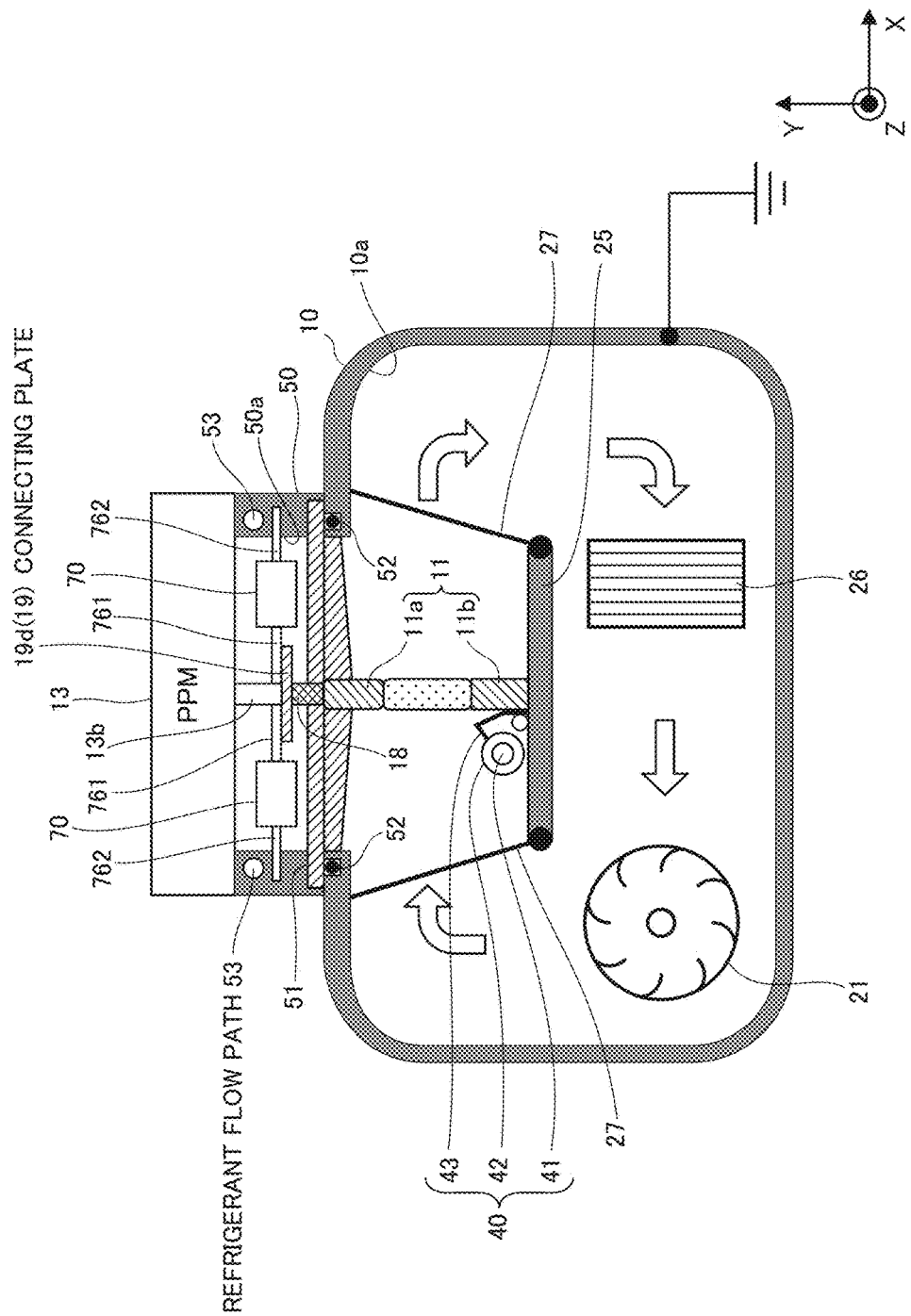
FIG. 9 is a cross-sectional view showing the laser chamber shown in FIG. 8 from the Z-axis direction.

Now, with reference to FIGS. 8 and 9, the gas laser device 1 including the polyimide condenser 70 will be described. FIG. 8 is a drawing explaining the configuration of the gas laser device 1 including the polyimide condenser 70. FIG. 9 is a cross-sectional view showing the laser chamber 10 shown in FIG. 8, as viewed from the Z-axis direction.

As described above, the polyimide condenser 70 may be applicable to a condenser such as the peaking condenser or the charging condenser to supply power to the main discharge part 11. Instead of the peaking condenser 60 shown in FIGS. 1 to 3, the multi-layered polyimide condenser 70 shown in FIGS. 6A to 6E is applied to the gas laser device 1 shown in FIGS. 8 and 9. The polyimide condenser 70 may be smaller than the peaking condenser 60. The configuration of the gas laser device 1 shown in FIGS. 8 and 9, which is the same as that of the gas laser device 1 shown in FIGS. 1 and 2, will not be described again here. The configuration of the polyimide condenser 70 included in the gas laser device 1 shown in FIGS. 8 and 9, which is the same as that of the polyimide condenser 70 shown in FIGS. 5A to 6E, will not be described again here.

Like the peaking condensers 60, the plurality of multi-layered polyimide condensers 70 shown in FIGS. 6A to 6E may be disposed such that more than one multi-layered polyimide condensers 70 are disposed upstream of the flow of the laser gas with respect to the first discharge electrode 11a and more than one multi-layered polyimide condensers 70 are disposed downstream of the flow of the laser gas with respect to the first discharge electrode 11a. The electrode terminals 761 of the polyimide condensers 70 may be connected to the high-voltage terminal 13b of the PPM 13. The electrode terminals 761 of the polyimide condensers 70 may be connected to the first discharge electrode 11a via the connecting part 19 and the feedthrough 18. Meanwhile, the electrode terminals 762 of the polyimide condensers 70 may be connected to the wall 50a of the holder 50. Since the polyimide condenser 70 may be smaller than the peaking condenser 60, a position at which the polyimide condenser 70 is disposed may be closer to the laser chamber 10 than a position at which the peaking condenser 60 is disposed. By this means, the loop area of the discharge circuit of the gas laser device 1 shown in FIGS. 8 and 9 may be smaller than that of the gas laser device 1 shown in FIGS. 1 and 2. The discharge efficiency of the gas laser device 1 shown in FIGS. 8 and 9 may be higher than that of the gas laser device 1 shown in FIGS. 1 and 2.

The connecting part 19 of the gas laser device 1 may be a member for connecting the polyimide condenser 70 applied to the peaking condenser to other components. The connecting part 19 may not include the connecting plate 19a, the connecting terminal 19b, and the connecting terminal 19c. The connecting part 19 may include a connecting plate 19d.

The connecting plate 19d may be constituted by a conductive plate having a rectangular cross section. The connecting plate 19d may be disposed along the longitudinal direction of the first discharge electrode 11a. The lower surface of the connecting plate 19d may be electrically connected to the feedthrough 18. Meanwhile, the upper surface of the connecting plate 19d may be electrically connected to the high-voltage terminal 13b of the PPM 13. The upper surface of the connecting plate 19d located upstream of the flow of the laser gas with respect to the first discharge electrode 11a may be electrically connected to the electrode terminals 761 of the plurality of polyimide condensers 70 located upstream of the flow of the laser gas with respect to the first discharge electrode 11a. Meanwhile, the upper surface of the connecting plate 19d located downstream of the flow of the laser gas with respect to the first discharge electrode 11a may be electrically connected to the electrode terminals 761 of the plurality of polyimide condensers 70 located downstream of the flow of the laser gas with respect to the first discharge electrode 11a.

The holder 50 may be a container that holds the polyimide condenser 70 applied to the peaking condenser. Since the polyimide condenser 70 may be smaller than the peaking condenser 60, the size of the holder 50 in the Y-axis direction may be smaller than the holder 50 holding the peaking condenser 60. A refrigerant flow path 53 through which a refrigerant flows may be formed in the interior of the wall 50a of the holder 50. The refrigerant may be cooling water. The refrigerant flow path 53 may be connected to a pump (not shown). The refrigerant flowing through the refrigerant flow path 53 may be circulated by the pump. The refrigerant flow path 53 may be formed in the interior of the wall 50a in the vicinity of the position at which the electrode terminal 762 of the polyimide condenser 70 is connected to the wall 50a. The heat generated in the polyimide condenser 70 may be transferred to the wall 50a of the holder 50 via the electrode terminal 762. The heat transferred to the wall 50a may be transferred to the refrigerant circulating through the refrigerant flow path 53, and discharged to the outside of the holder 50. By this means, it is possible to more effectively prevent the increase in the temperature of the polyimide condenser 70 included in the gas laser device 1 shown in FIGS. 8 and 9 than the peaking condenser 60 included in the gas laser device 1 shown in FIGS. 1 and 2. The other configuration of the gas laser device 1 shown in FIGS. 8 and 9 may be the same as the configuration of the gas laser device 1 shown in FIGS. 1 and 2.

With the above-described configuration, the gas laser device 1 shown in FIGS. 8 and 9 can stabilize the performance of the peaking condenser even though it outputs a pulsed laser beam at a high repetition frequency. By this means, the gas laser device 1 shown in FIGS. 8 and 9 can stabilize the pulse voltage applied from the peaking condenser to the main discharge part 11, and therefore to stabilize the performance of the outputted pulsed laser beam. In particular, the gas laser device 1 shown in FIGS. 8 and 9 can stabilize the pulse energy, the waveform including the pulse width, and the waveform including the spectral width of the outputted pulsed laser beam. Moreover, the gas laser device 1 shown in FIGS. 8 and 9 can improve the discharge efficiency of the discharge circuit of the gas laser device 1.

7. Modifications of the Polyimide Condenser

Now, with reference to FIGS. 10 to 12, a modification of the polyimide condenser 70 will be described. The polyimide condenser 70 of the gas laser device 1 used as the light source of a semiconductor exposure apparatus may be required to have a capacitance of, for example, about 150 pF to 400 pF. Moreover, the polyimide condenser 70 may be required to have the performance on a dielectric withstanding voltage of, for example, about 20 kV to 50 kV. However, currently, such a polyimide condenser having the above-described capacitance and high performance on the dielectric withstanding voltage has not been in widespread use.

Figure 10:
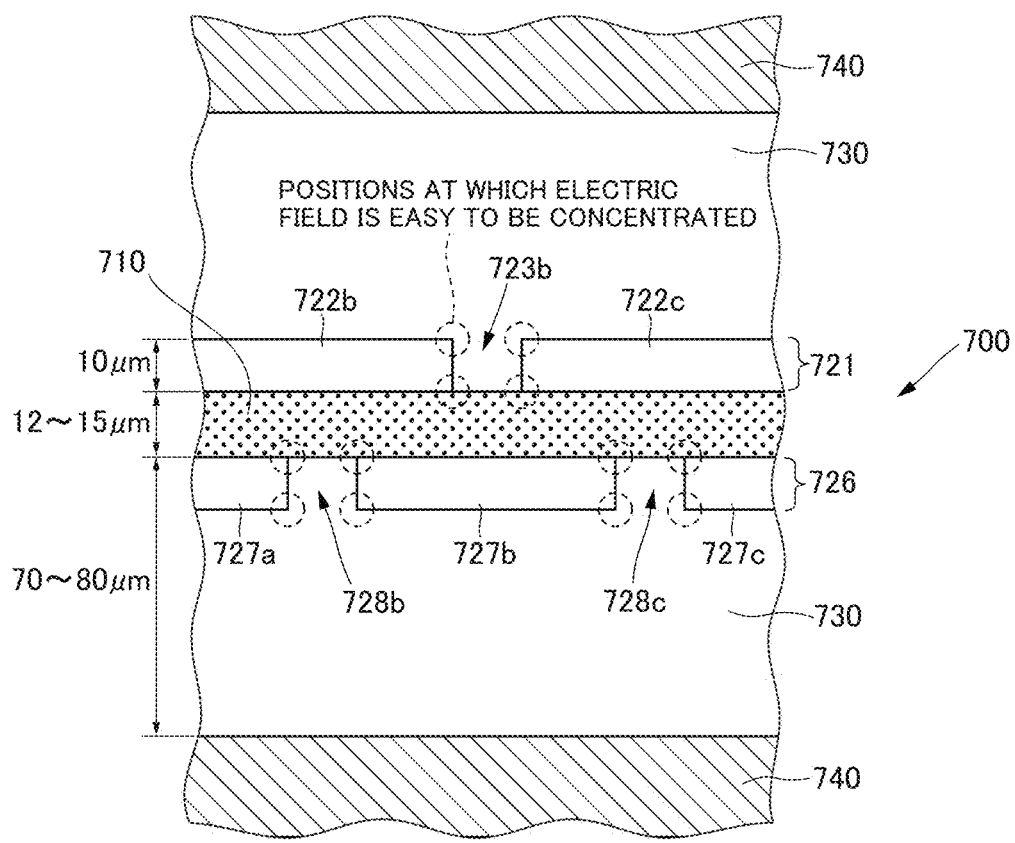
FIG. 10 is an enlarged view showing part of one condenser layer of the polyimide condenser shown in FIGS. 6A to 6E.

FIG. 10 is an enlarged view showing part of one condenser layer 700 of the polyimide condenser 70 shown in FIGS. 6A to 6E. As described above, one condenser layer 700 may include the pair of electrode films 720 and the polyimide film 710. The pair of electrode films 720 may include the first electrode film 721 and the second electrode film 726. The first electrode film 721 may include the plurality of electrode regions 722a to 722e, and the second electrode film 726 may include the plurality of electrode regions 727a to 727d.

When a high voltage is applied to the polyimide condenser 70, the electric field may be easy to be concentrated at the corners of the plurality of electrode regions 722a to 722e and 727a to 727d of the pair of electrode films 720, as indicated by broken lines shown in FIG. 10. In addition, as indicated by the broken lines shown in FIG. 10, the electric field may be easy to be concentrated on the boundaries between the polyimide film 710 and the plurality of electrode regions 722a to 722e, and 727a to 727d, and the boundaries between the electrical insulating layer 730 and the plurality of electrode regions 722a to 722e, and 727a to 727d. Therefore, insulation breakdown may occur among the plurality of electrode regions 722a to 722e, and among the plurality of electrode regions 727a to 727d, and therefore short circuit may be easy to occur among the plurality of electrode regions 722a to 722e, and among the plurality of electrode regions 727a to 727d. Therefore, there may be a room for improvement of preventing the insulation breakdown among the plurality of electrode regions 722a to 722e, and among the plurality of electrode regions 727a to 727d. By preventing the insulation breakdown, it is possible to improve the performance on the dielectric withstanding voltage of the polyimide condenser 70.

Here, the thickness of the polyimide film 710 of the polyimide condenser 70 shown in FIG. 10 may be, for example, about 12 µm to 15 µm. The thickness of each of the plurality of electrode regions 722a to 722e and 727a to 727d of the pair of electrode films 720 may be, for example, about 10 µm. The thickness of the electrical insulating layer 730 from the surface of the polyimide film 710 may be, for example, about 70 µm to 80 µm.

Figure 11:
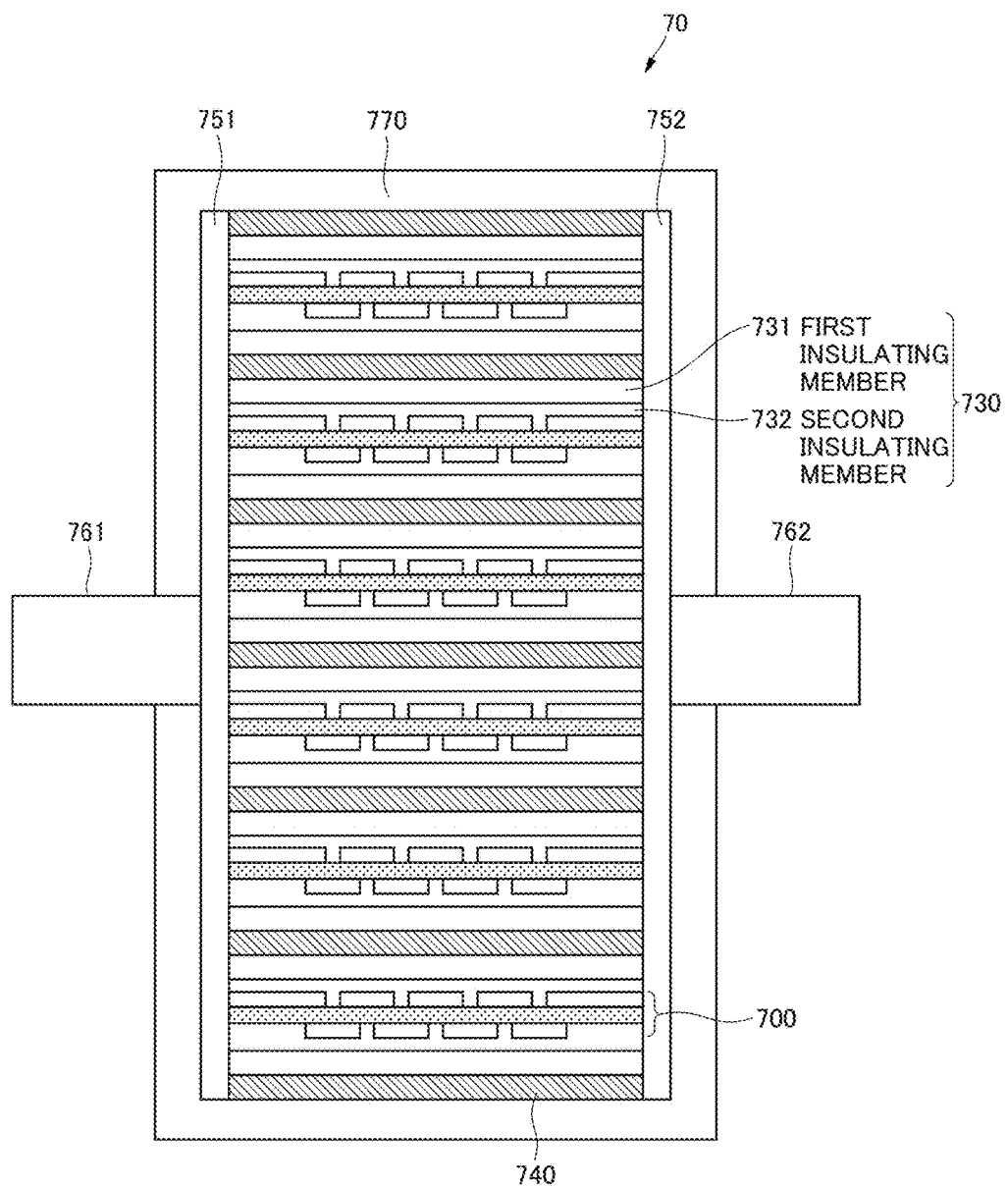
FIG. 11 is a drawing showing a modification of the polyimide condenser.

FIG. 11 is a drawing explaining a modification of the polyimide condenser 70. FIG. 12 is an enlarged view showing part of one polyimide condenser layer 700 of the polyimide condenser 70 shown in FIG. 11. The polyimide condenser 70 according to the modification may be different from the polyimide condenser 70 shown in FIGS. 6A to 6E mainly in the configuration of the plurality of electrical insulating layers 730. The configuration of the polyimide condenser 70 according to the modification, which is the same as that of the polyimide condenser 70 shown in FIG. 6A to 6E, will not be described again here.

Each of the plurality of electrical insulating layers 730 of the polyimide condenser 70 according to the modification may include a plurality of insulating members whose dielectric breakdown voltages are different from each other. Each of the plurality of electric insulating layers 730 may at least include an insulating member as an elastic body. Each of the plurality of electrical insulating layers 730 may include a plurality of insulating members which are different in the dielectric breakdown voltage and whether or not being an elastic body. Each of the plurality of electrical insulating layers 730 may include a first insulating member 731 and a second insulating member 732.

The second insulating member 732 may be formed by using an electrical insulating material which is an inelastic body. The second insulating member 732 may be formed by using an electrical insulating material having a dielectric breakdown voltage which is greater than that of the first insulating member 731. The second insulating member 732 may be formed by using an electrical insulating material which can adhere tightly to the pair of electrode films 720 and the polyimide film 710 of each of the plurality of condenser layers 700. The second insulating member 732 may be formed by using polyimide resin. The second insulating member 732 may be formed by applying liquid polyimide resin, such as polyimide varnish, to the pair of electrode films 720 and the polyimide film 710, and then drying the liquid polyimide resin to be solidified. The thickness of the second insulating member 732 from the surface of the polyimide film 710 may be, for example, about 20 μm. The thickness of the second insulating member 732 from the surface of each of the plurality of electrode regions 722a to 722e, and 727a to 727d may be, for example, about 10 μm.

The second insulating member 732 may be provided in contact with the pair of electrode films 720 and the polyimide film 710 of each of the plurality of condenser layers 700. The second insulating member 732 may cover the surfaces of the plurality of electrode regions 722a to 722e and 727a to 727d of the pair of electrode films 720, and the surface of the polyimide film 710. In this case, the second insulating member 732 may cover the surfaces of the plurality of electrode regions 722a to 722e and 727a to 727d, and the surface of the polyimide film 710 so as to fill the intervals 723a to 723d and 728a to 728e. Moreover, the second insulating member 732 may cover the surfaces of the plurality of electrode regions 722a to 722e and 727a to 727d, and the surface of the polyimide film 710 such that the surface of the second insulating member 732 covering them is approximately flat and is approximately parallel to the polyimide film 710.

If the surface of the second insulating member 732 is not flat but uneven according to the concave and convex shape formed by the plurality of electrode regions 722a to 722e and 727a to 727d and the intervals 723a to 723d and 728a to 728e, the electric field may be easy to be concentrated at the corners of the uneven second insulating member 732. Therefore, it is preferred that the surface of the second insulating member 732 is approximately flat.

The first insulating member 731 may be formed by using an electrical insulating material as an elastic body. The first insulating member 731 may be formed by using an electrical insulating material having a dielectric breakdown voltage which is lower than that of the second insulating member 732. The first insulating member 731 may be formed by using an electrically insulating member having a certain level of heat conductivity. The first insulating member 731 may be formed by using a material which can adhere tightly to the second insulating member 732 and the heat sink layer 740. The first insulating member 731 may be formed by using silicone resin. The material for forming the first insulating member 731 may be substantially the same as the material for forming the plurality of electrical insulating layers 730 shown in FIGS. 6A to 6E. The thickness of the first insulating member 731 from the surface of the second insulating member 732 may be, for example, about 50 μm.

The first insulating member 731 may be provided in contact with the second insulating member 732 and the heat sink layer 740. The first insulating member 731 may be provided to fill the space between the second insulating member 732 and the heat sink layer 740.

In addition, the number of condensers connected in series, which are included in one condenser layer 700 of the polyimide condenser 70 according to the modification, may be, for example, 8 to 30, when the required performance on the dielectric withstanding voltage as a dielectric breakdown voltage is 20 kV to 50 kV. The number of the plurality of condenser layers 700 of the polyimide condenser 70 according to the modification may be, for example, 16 to 50, when the required capacitance is 150 pF to 400 pF.

The other configuration of the polyimide condenser 70 according to the modification may be the same as the configuration of the polyimide condenser 70 shown in FIGS. 6A to 6E.

With the above-described configuration, the polyimide condenser 70 according to the modification can ensure the optimum capacitance of about 150 pF to 400 pF for the condenser of the gas laser device 1 used as the light source of a semiconductor exposure apparatus. Moreover, in the polyimide condenser 70 according to the modification, each of the plurality of electrical insulating layers 730 includes the second insulating member 732, and therefore it is possible to improve the performance on the dielectric withstanding voltage to ensure high performance on the dielectric withstanding voltage of about 20 kV to 50 kV. In addition, in the polyimide condenser 70 according to the modification, each of the plurality of electrical insulating layers 730 includes the first insulating member 731, and therefore it is possible to efficiently transfer the heat generated in the condenser layer 700 to the heat sink layer 740 via the second insulating member 732. Moreover, in the polyimide condenser 70 according to the modification, each of the plurality of electrical insulating layers 730 includes the first insulating member 731, and therefore it is possible to absorb the thermal deformation of the condenser layer 700, the second insulating member 732, and the heat sink layer 740 into the first insulating member being elastically 730 deformed.

By this means, the polyimide condenser 70 according to the modification can more improve the performance on the dielectric withstanding voltage and the durability performance than the polyimide condenser 70 shown in FIGS. 6A to 6E, and therefore can further stabilize the performance of the condenser even when the gas laser device 1 outputs a pulsed laser beam at a high repetition frequency. As a result, the gas laser device 1 including the polyimide condenser 70 according to the modification can more stabilize the performance of the outputted pulsed laser beam than the gas laser device 1 including the polyimide condenser 70 shown in FIGS. 6A to 6E.

Figure 12:
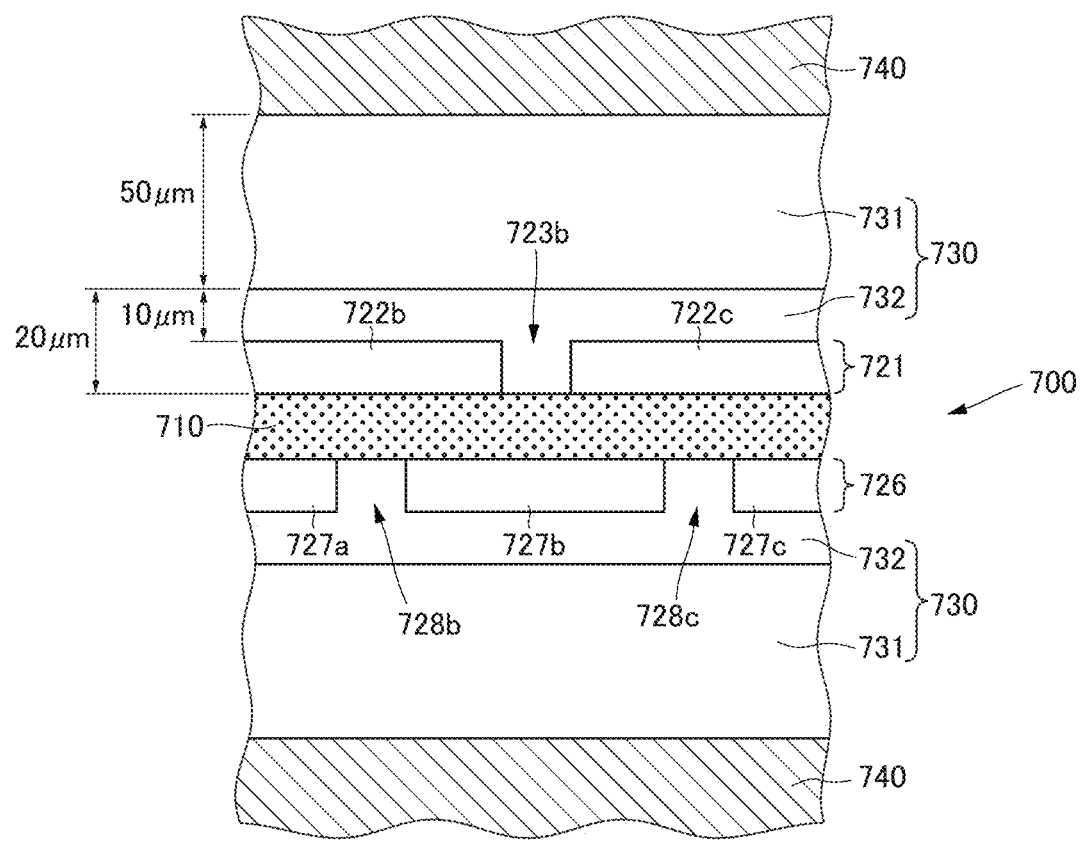
FIG. 12 is an enlarged view showing part of one condenser layer of the polyimide condenser shown in FIG. 11.

Here, the modification of the polyimide condenser 70 shown in FIGS. 11 and 12 is not limited to the polyimide condenser 70 applied to the peaking condenser, shown in FIGS. 6A to 6E. The modification of the polyimide condenser 70 shown in FIGS. 11 and 12 may be applicable to the polyimide condenser 70 applied to the charging condenser, shown in FIGS. 7A and 7B.

8. Others 8.1 Charge and Discharge Circuit Used in the Gas Laser Device

Figure 13:
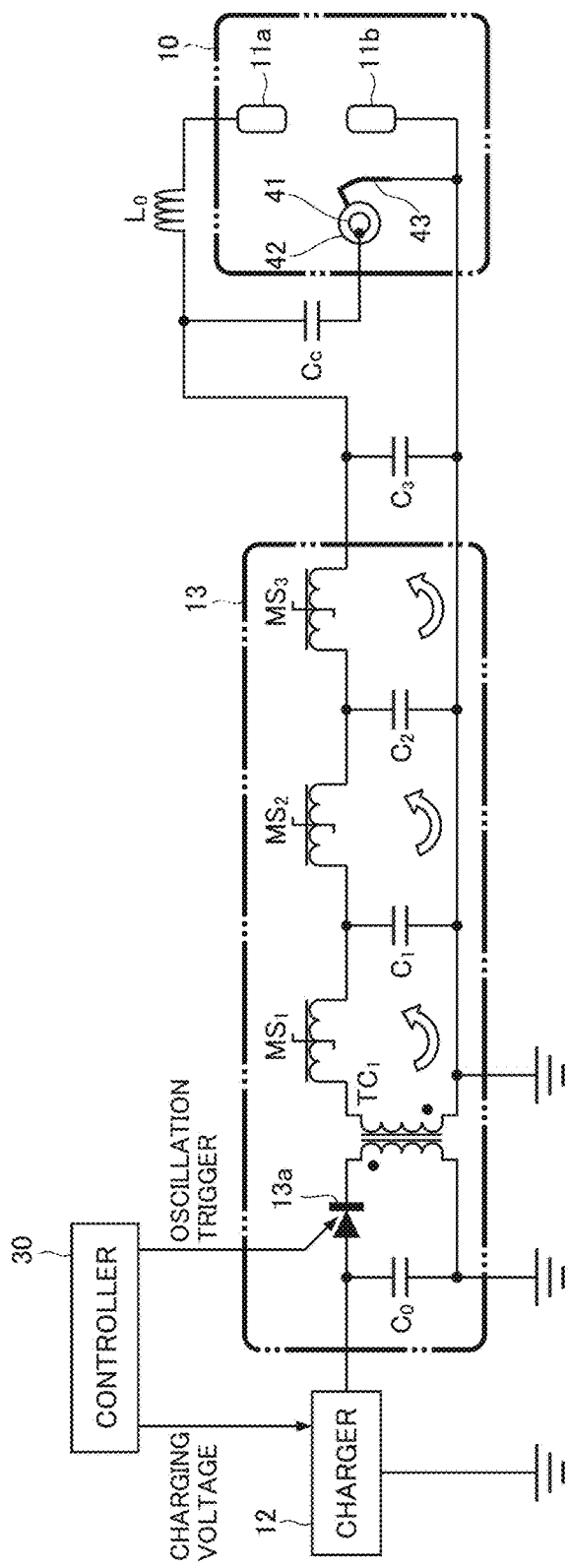
FIG. 13 is a drawing explaining the circuit configuration of a charge and discharge circuit used in the gas laser device.

Now, with reference to FIG. 13, a charge and discharge circuit used in the gas laser device 1 will be described. FIG. 13 is a drawing explaining the circuit configuration of the charge and discharge circuit used in the gas laser device 1.

The PPM 13 may include a semiconductor switch as the above-described switch 13a, a transformer $TC_1$, magnetic switches $MS_1$ to $MS_3$, the charging condenser $C_0$, and condensers $C_1$ and $C_2$. The condensers $C_1$ and $C_2$ may be condensers for pulse compression. The condenser $C_3$ may be a peaking condenser. The condenser $C_c$ may be a condenser for preliminary ionization. When the value of the time integration of the voltage applied to the magnetic switches $MS_1$ to $MS_3$ reaches a threshold value, a current may be easy to flow to the magnetic switches $MS_1$ to $MS_3$. The threshold value may be different for each of the magnetic switches. With the present embodiment, the state in which the magnetic switches $MS_1$ to $MS_3$ are easy to flow a current therethrough may be described as "the magnetic switch is closed."

The switch 13a may be provided between the primary side of the transformer $TC_1$ and the charging condenser $C_0$. The magnetic switch $MS_1$ may be provided between the secondary side of the transformer $TC_1$ and the condenser $C_1$. The magnetic switch $MS_2$ may be provided between the condenser $C_1$ and the condenser $C_2$. The magnetic switch $MS_3$ may be provided between the condenser $C_2$ and the condenser $C_3$. The primary side and the secondary side of the transformer $TC_1$ may be electrically insulated from one another. The direction of the winding of the primary side of the transformer $TC_1$ may be opposite to that of the secondary side.

The second discharge electrode 11b and the preliminary ionization outer electrode 43 may be connected to ground. A voltage-dividing circuit including the condenser $C_c$ may be connected in parallel to the first discharge electrode 11a and the second discharge electrode 11b. The condenser $C_c$ may be connected in series to the preliminary ionization inner electrode 41, the dielectric pipe 42, and the preliminary ionization outer electrode 43.

Now, the operation of the charge and discharge circuit shown in FIG. 13 will be described. The controller 30 may set the charging voltage Vhv in the charger 12. The charger 12 may charge the charging condenser $C_0$ based on the charging voltage Vhv set therein. The controller 30 may output an oscillation trigger signal to the switch 13a of the PPM 13. Upon receiving the oscillation trigger signal, the switch 13a of the PPM 13 may be turned on. When the switch 13a is turned on, the charging condenser $C_0$ may flow a current to the primary side of the transformer $TC_1$.

When the current flows in the primary side of the transformer $TC_1$, a current in the opposite direction may flow in the secondary side of the transformer $TC_1$ due to electromagnetic induction. When the current flows in the secondary side of the transformer $TC_1$, the value of the time integration of the voltage applied to the magnetic switch $MS_1$ may reach a threshold value. When the value of the time integration of the voltage applied to the magnetic switch $MS_1$ reaches the threshold value, a magnetic saturation occurs in the magnetic switch $MS_1$, and therefore the magnetic switch $MS_1$ may be closed. When the magnetic switch $MS_1$ is closed, the current flows from the secondary side of the transformer $TC_1$ to the condenser $C_1$, so that the condenser $C_1$ may be charged.

After the condenser $C_1$ is charged, a magnetic saturation may occur in the magnetic switch $MS_2$, and therefore the magnetic switch $MS_2$ may be closed. When the magnetic switch $MS_2$ is closed, the current may flow from the condenser $C_1$ to the condenser $C_2$, and therefore the condenser $C_2$ may be charged. In this case, the condenser $C_2$ may be charged with the pulse width of the current shorter than the pulse width of the current for charging the condenser $C_1$.

After the condenser $C_2$ is charged, a magnetic saturation may occur in the magnetic switch $MS_3$, and therefore the magnetic switch $MS_3$ may be closed. After the magnetic switch $MS_3$ is closed, the current may flow from the condenser $C_2$ to the condenser $C_3$, and therefore the condenser $C_3$ may be charged. In this case, the condenser $C_3$ may be charged with the pulse width of the current shorter than the pulse width of the current for charging the condenser $C_2$.

As described above, the current flows from the condenser $C_1$ to the condenser $C_2$, and then from the condenser $C_2$ to the condenser $C_3$ in sequence, and therefore the pulse width of the current may be compressed.

After being charged, the condenser $C_3$ may apply a pulse voltage between the first discharge electrode 11a and the second discharge electrode 11b.

The voltage-dividing circuit connected in parallel to the first discharge electrode 11a and the second discharge electrode 11b may divide the pulse voltage applied to between the first discharge electrode 11a and the second discharge electrode 11b. The range of the divided pulse voltage may be 25% to 75% of the pulse voltage applied to between the first discharge electrode 11a and the second discharge electrode 11b. The divided pulse voltage may be applied to between the preliminary ionization inner electrode 41 and the preliminary ionization outer electrode 43. The time constant of the voltage-dividing circuit may be adjusted to a desired value by adjusting the division ratio of the voltage-dividing circuit, the capacitance of the condenser $C_c$, and the inductance of an inductor $L_0$. By this means, it is possible to adjust the timing of the preliminary ionization discharge for the main discharge. The combined capacitance of the voltage-dividing circuit may be adjusted to be equal to or lower than 10% of the capacitance of the condenser $C_3$. When the pulse voltage is applied to between the preliminary ionization inner electrode 41 and the preliminary ionization outer electrode 43, a corona discharge may be generated on the surface of the dielectric pipe 42. Then, the laser gas in the discharge space of the main discharge part 11 may be preliminarily ionized by UV light generated by this corona discharge.

When the pulse voltage applied to between the first discharge electrode 11a and the second discharge electrode 11b is greater than the dielectric strength voltage of the laser gas, the insulation breakdown of the laser gas may occur. When the insulation breakdown of the laser gas occurs, a main discharge may be generated between the first discharge electrode 11a and the second discharge electrode 11b. In this case, a negative potential may be applied to the first discharge electrode 11a.

8.2 Modification

The gas laser device 1 may not be an excimer laser apparatus, but be a fluorine molecule laser apparatus using fluorine gas and buffer gas as the laser gas.

The first discharge electrode 11a may not be a cathode electrode but be an anode electrode. The second discharge electrode 11b may not be an anode electrode but be a cathode electrode. In this case, for example, by making the direction of the winding of the primary side the same as the direction of the winding of the secondary side of the transformer $TC_1$ of the PPM 13, the first discharge electrode 11a and the second discharge electrode 11b may become an anode electrode and a cathode electrode, respectively.

The gas laser device 1 may not be a line narrowing laser device having the LNM 14, but be a laser device configured to output spontaneously oscillating light. In this case, a high-reflection mirror may be provided in the gas laser device 1, instead of the LNM 14.

It would be obvious to a person skilled in the art that the technologies described in the above-described embodiments including the modifications may be compatible with each other.

The descriptions above are intended to be illustrative only and the present disclosure is not limited thereto. Therefore, it will be apparent to those skilled in the art that it is possible to make modifications to the embodiments of the present disclosure within the scope of the appended claims.

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "a/an" in this specification and appended claims should be interpreted as "at least one" or "one or more."

REFERENCE SIGNS LIST 1 gas laser device
10 laser chamber
11 main discharge part
11a first discharge electrode
11b second discharge electrode
30 controller
70 polyimide condenser
700 condenser layer
710 polyimide film
720 electrode film
721 first electrode film
722 electrode region
723 interval
726 second electrode film
727 electrode region
728 interval
730 electrical insulating layer
731 first insulating member
732 second insulating member
740 heat sink layer

The invention claimed is:

1. A gas laser device comprising:
a laser chamber containing laser gas;
a first discharge electrode disposed in the laser chamber;
a second discharge electrode disposed to face the first discharge electrode in the laser chamber; and
a condenser including a polyimide dielectric and configured to supply power to between the first discharge electrode and the second discharge electrode, wherein:
the condenser includes a condenser layer composed of a polyimide film constituting the polyimide dielectric and a pair of electrode films disposed on the polyimide film such that part of each of the pair of electrode films faces one another via the polyimide film;
surfaces of the pair of electrode films are covered with electrical insulating layers;
the condenser is formed by laminating a plurality of the condenser layers;
the condenser includes a plurality of heat sink layers disposed between the plurality of condenser layers which are laminated;
each of the plurality of electrical insulating layers includes at least a first insulating member and a second insulating member whose dielectric breakdown voltage is higher than that of the first insulating member;
the second insulating member is provided in contact with an electrode film of the pair of electrode films and the polyimide film; and
the first insulating member is provided in contact with the second insulating member and one of the plurality of heat sink layers.

2. The gas laser device according to claim 1, wherein:
the pair of electrode films includes a first electrode film and a second electrode film;
each of the first electrode film and the second electrode film is divided into a plurality of electrode regions at intervals in a predetermined direction, in an in-plane direction of the polyimide film; and
an end portion of each of the plurality of electrode regions of the first electrode film faces an end portion of each of the plurality of electrode regions of the second electrode film via the polyimide film.

3. The gas laser device according to claim 1, wherein:
the pair of electrode films includes a first electrode film and a second electrode film;
each of the first electrode film and the second electrode film is divided into a plurality of electrode regions at intervals in a predetermined direction, in an in-plane direction of the polyimide film; and
each of the plurality of electrode regions has a rectangular shape.

4. The gas laser device according to claim 1, wherein:
the pair of electrode films includes a first electrode film and a second electrode film;
the first electrode film is divided into a plurality of electrode regions including at least three electrode regions at intervals in a predetermined direction, in an in-plane direction of the polyimide film; and
two electrode regions of the plurality of electrode regions located at opposite ends of the plurality of electrode regions each has a width in the predetermined direction greater than that of another electrode region of the plurality of electrode regions located between the two electrode regions.

5. The gas laser device according to claim 1, wherein:
the pair of electrode films includes a first electrode film and a second electrode film;

each of the first electrode film and the second electrode film is divided into a plurality of electrode regions at intervals in a predetermined direction, in an in-plane direction of the polyimide film; and the intervals have substantially same lengths with each other.

6. The gas laser device according to claim 1, wherein:
the pair of electrode films includes a first electrode film and a second electrode film;
each of the first electrode film and the second electrode film is divided into a plurality of electrode regions at intervals in a predetermined direction, in an in-plane direction of the polyimide film; and
each of the intervals has a length greater than a thickness of the polyimide film.

7. The gas laser device according to claim 1, further comprising electrode plates, wherein:
the plurality of the condenser layers, the plurality of electrical insulating layers, and the plurality of heat sink layers are sandwiched between the electrode plates.

8. The gas laser device according to claim 1, further comprising two outside heat sink layers disposed respectively on outside of two outermost condenser layers of the plurality of condenser layers.

9. The gas laser device according to claim 1, wherein a surface of the second insulating member is substantially flat.

10. The gas laser device according to claim 1, wherein:
the pair of electrode films includes a first electrode film and a second electrode film;
the plurality of condenser layers include a first condenser layer, a second condenser layer adjacent to the first condenser layer, and a third condenser layer adjacent to the second condenser layer;
the first electrode film of the first condenser layer faces the first electrode film of the second condenser layer via one of the plurality of heat sink layers; and
the second electrode film of the second condenser layer faces the second electrode film of the third condenser layer via another one of the plurality of heat sink layers.

11. A gas laser device comprising:
a laser chamber containing laser gas;
a first discharge electrode disposed in the laser chamber;
a second discharge electrode disposed to face the first discharge electrode in the laser chamber; and
a condenser including a polyimide dielectric and configured to supply power to between the first discharge electrode and the second discharge electrode, wherein:
the condenser includes a condenser layer composed of a polyimide film constituting the polyimide dielectric and a pair of electrode films disposed on the polyimide film such that part of each of the pair of electrode films faces one another via the polyimide film;
surfaces of the pair of electrode films are covered with electrical insulating layers;
the condenser is formed by laminating a plurality of the condenser layers;
the condenser includes a plurality of heat sink layers disposed between the plurality of condenser layers which are laminated;
each of the plurality of electrical insulating layers includes at least a first insulating member as an elastic body and a second insulating member as an inelastic body;
the second insulating member is provided in contact with an electrode film of the pair of electrode films and the polyimide film; and the first insulating member is provided in contact with the second insulating member and one of the plurality of heat sink layers.

12. The gas laser device according to claim 11, wherein:
the pair of electrode films includes a first electrode film and a second electrode film;
each of the first electrode film and the second electrode film is divided into a plurality of electrode regions at intervals in a predetermined direction, in an in-plane direction of the polyimide film; and
an end portion of each of the plurality of electrode regions of the first electrode film faces an end portion of each of the plurality of electrode regions of the second electrode film via the polyimide film.

13. The gas laser device according to claim 11, wherein:
the pair of electrode films includes a first electrode film and a second electrode film;
each of the first electrode film and the second electrode film is divided into a plurality of electrode regions at intervals in a predetermined direction, in an in-plane direction of the polyimide film; and
each of the plurality of electrode regions has a rectangular shape.

14. The gas laser device according to claim 11, wherein:
the pair of electrode films includes a first electrode film and a second electrode film;
the first electrode film is divided into a plurality of electrode regions including at least three electrode regions at intervals in a predetermined direction, in an in-plane direction of the polyimide film; and
two electrode regions of the plurality of electrode regions located at opposite ends of the plurality of electrode regions each has a width in the predetermined direction greater than that of another electrode region of the plurality of electrode regions located between the two electrode regions.

15. The gas laser device according to claim 11, wherein:
the pair of electrode films includes a first electrode film and a second electrode film;
each of the first electrode film and the second electrode film is divided into a plurality of electrode regions at intervals in a predetermined direction, in an in-plane direction of the polyimide film; and
the intervals have substantially same lengths with each other.

16. The gas laser device according to claim 11, wherein:
the pair of electrode films includes a first electrode film and a second electrode film;
each of the first electrode film and the second electrode film is divided into a plurality of electrode regions at intervals in a predetermined direction, in an in-plane direction of the polyimide film; and
each of the intervals has a length greater than a thickness of the polyimide film.

17. The gas laser device according to claim 11, further comprising electrode plates, wherein:
the plurality of the condenser layers, the plurality of electrical insulating layers, and the plurality of heat sink layers are sandwiched between the electrode plates.

18. The gas laser device according to claim 11, further comprising two outside heat sink layers disposed respectively on outside of two outermost condenser layers of the plurality of condenser layers.

19. The gas laser device according to claim 11, wherein a surface of the second insulating member is substantially flat.

20. The gas laser device according to claim 11, wherein:
the pair of electrode films includes a first electrode film and a second electrode film;
the plurality of condenser layers include a first condenser layer, a second condenser layer adjacent to the first condenser layer, and a third condenser layer adjacent to the second condenser layer;
the first electrode film of the first condenser layer faces the first electrode film of the second condenser layer via one of the plurality of heat sink layers; and
the second electrode film of the second condenser layer faces the second electrode film of the third condenser layer via another one of the plurality of heat sink layers.

* * * * *